United States Patent
Loughran

(10) Patent No.: US 10,583,563 B2
(45) Date of Patent: Mar. 10, 2020

(54) METHODS AND SYSTEMS FOR ADVANCED COMMUNICATIONS IN ROBOTIC SYSTEMS

(71) Applicant: Kevin Loughran, Denville, NJ (US)

(72) Inventor: Kevin Loughran, Denville, NJ (US)

(73) Assignee: Kevin Loughran, Denville, NJ (US)

( * ) Notice: Subject to any disclaimer, the term of this patent is extended or adjusted under 35 U.S.C. 154(b) by 126 days.

(21) Appl. No.: 15/442,525

(22) Filed: Feb. 24, 2017

(65) Prior Publication Data

US 2017/0239816 A1  Aug. 24, 2017

Related U.S. Application Data

(60) Provisional application No. 62/299,216, filed on Feb. 24, 2016.

(51) Int. Cl.
| | |
|---|---|
| *H04W 8/00* | (2009.01) |
| *B25J 13/00* | (2006.01) |
| *G05D 1/00* | (2006.01) |
| *H04L 29/08* | (2006.01) |

(52) U.S. Cl.
CPC .......... *B25J 13/006* (2013.01); *G05D 1/0022* (2013.01); *G05D 1/0027* (2013.01); *H04L 67/12* (2013.01)

(58) Field of Classification Search
CPC ....... H04W 4/00; H04W 64/003; H04W 4/70; H04W 84/12; H04W 8/005; B25J 13/006; H04L 67/104; H04L 67/16; B62D 57/032; G05D 1/0022; G05D 1/0027; G05D 1/104
USPC .......................... 700/248; 370/328; 455/450
See application file for complete search history.

(56) References Cited

U.S. PATENT DOCUMENTS

| | | | | |
|---|---|---|---|---|
| 2004/0030449 | A1* | 2/2004 | Solomon | B64C 39/024 700/245 |
| 2015/0173034 | A1* | 6/2015 | Rode | H04W 56/001 370/330 |
| 2015/0346726 | A1* | 12/2015 | Davoodi | B63B 22/24 701/21 |

* cited by examiner

*Primary Examiner* — Dalena Tran
(74) *Attorney, Agent, or Firm* — Marin Patents LP; Gustavo Marin

(57) ABSTRACT

Systems and methods for determining by a first robotic device which portions of data received that is to be transmitted to one or more other robotic devices based on, at least, one or more functions of the data received, and characteristics of the data received. It may further be determined at a first robotic device an advanced communication technique may be executed by a first robotic device and/or one or more other robotic devices to improve communications between robotic devices.

20 Claims, 17 Drawing Sheets

METHODS AND SYSTEMS FOR ADVANCED COMMUNICATIONS IN ROBOTIC SYSTEMS

CROSS-REFERENCE TO RELATED APPLICATIONS

This application claims the benefit of, and priority to, U.S. provisional application Ser. No. 62/299,216 filed on Feb. 24, 2016, the entire specification of which is incorporated herein by reference.

BACKGROUND OF THE INVENTION

Field of the Art

The present invention generally relates to the field of robotics. In particular, the present invention is directed to methods and systems for communication within a robotic system.

Discussion of the State of the Art

Applications of Wireless Robots are well known and encompass ground based, aerial, as well as undersea instantiations of these machines. The nature of Wireless Robots enables them to operate without fixed means for communications or power, and prior art has shown these machines remotely controlled, and even having autonomous operation.

Despite the untethered nature of these machines, a communication method is generally required for transporting various types of information between the robot and a central point. These information types may include Control Information, Telemetry Information, and Content Information. Content Information could include in the reverse link (robot to central point): video and sensor inputs, and in the forward link (central point to robot): visual information and actuator commands.

Wireless communications methods for transporting such information may include such mediums as RF, optical, infrared to name a few. In all cases the communication link has performance limitations related to distance, transmit power, link budget, and information bandwidth.

Recently, Wireless Robot applications have been envisioned to incorporate a plurality of Wireless Robots working together in teams. Such applications show benefit in terms of improved operational dexterity, a broader application space, and increased miniaturization leading to potential power efficiency.

What is needed is a system and method, in the context of such plurality of robots, wherein the communication link between the plurality of robots and a central point is substantially improved. This provides benefits in various dimensions, including longer effective distance of the communication link, increased information bandwidth of the communication link, and improved power utilization for the communication link. One can also imagine increased reliability through redundancy, and autonomous operation.

SUMMARY OF THE INVENTION

Accordingly, the inventor has conceived and reduced to practice, in a preferred embodiment of the invention, a system and method for improving communication for a plurality of robots with each other and one or more central points. This provides benefits in various dimensions, including longer effective distance of the communication link, increased information bandwidth of the communication link, and improved power utilization for the communication link.

Some aspects of the present disclosure include methods and systems for adaptive communication between two or more robotic devices and a central point. A central point may be any number of communicating devices or computer devices. Those skilled in the art will readily appreciate how the invention can allow for several types of central points. In some embodiments, methods and systems of the present disclosure allow for monitoring of a first robotic device, for data from a central point. It may be determined by a first robotic device, and as a function of the data received, which portion(s) of the data received that is/are to be transmitted to one or more other robotic devices. It may further be determined at a first robotic device, and as a function of data received from a central point, an advanced communication technique (or arrangement) and the advanced communication technique may be executed by a first robotic device and/or one or more other robotic devices.

Some aspects of the present disclosure include methods for communication within a robotic system including a central point and two or more robots. A subset of two or more robots may receive information from a central point. A subset of robots may include one or more robots. It may then be determined by a robotic system an appropriate advanced communication technique and the advanced communication technique may be executed by the robotic system.

Some aspects of the present disclosure include a robotic system that includes a central point and at least two robots in communication with a central point; wherein both the central point and the at least two robots are capable of communicating information using advanced communication methods. An array of advanced communication methods will be disclosed herein.

As alluded to above, in some embodiments, an advanced communication technique is executed by a robotic system. After reading this disclosure in its entirety a person of ordinary skill in the art will readily appreciate the vast number of advanced communication techniques that may be utilized in some embodiments of the disclosure. Some examples of advanced communications techniques are provided herein, however, not all possible advanced communication techniques are disclosed but those not discussed will be appreciated by those of skill in the art. This functionality can significantly reduce the amount of energy and time required for two or more robotic devices to carry out a task received from a central point.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
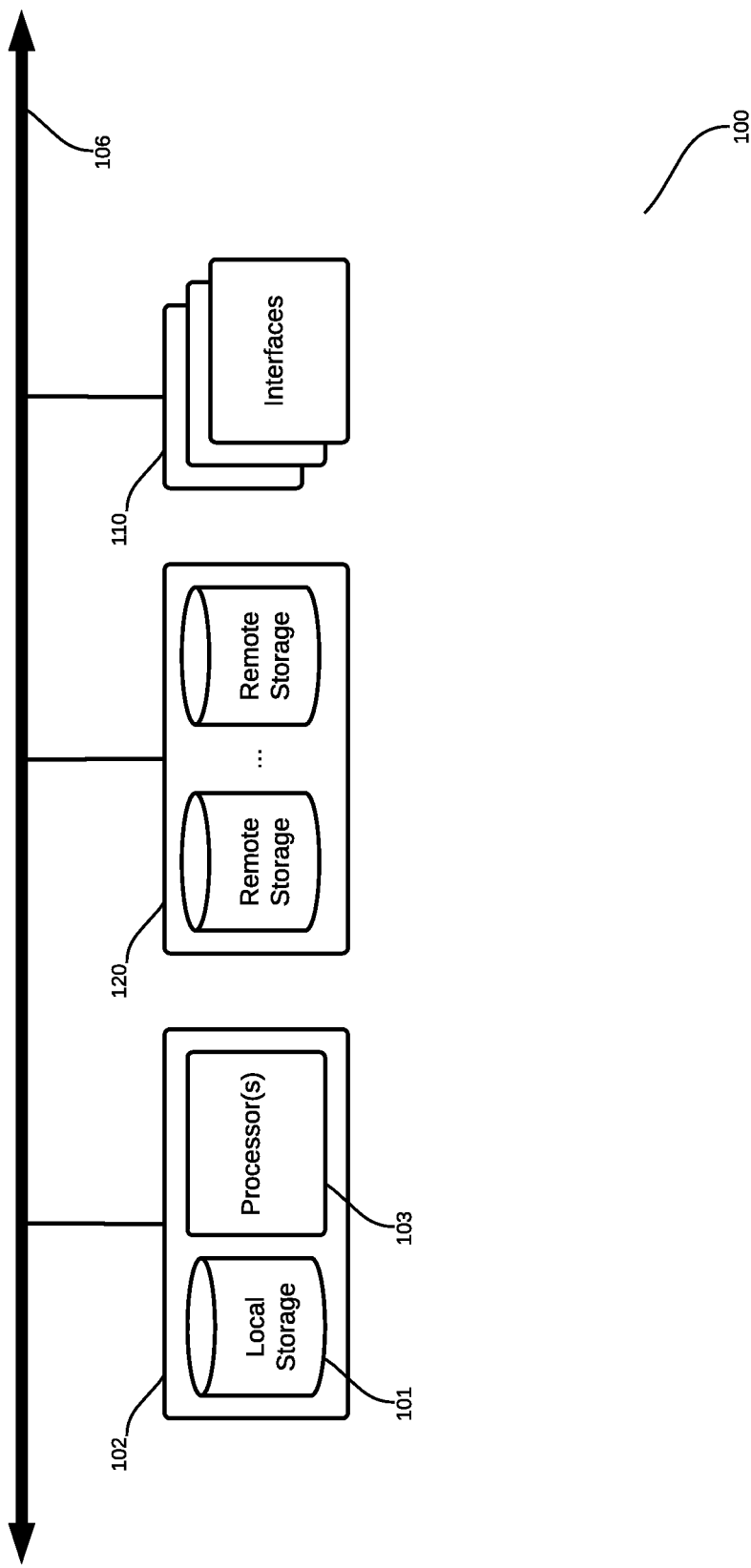
FIG. 1 is a block diagram illustrating an exemplary hardware architecture of a computing device used in an embodiment of the invention.

The inventor has conceived, and reduced to practice, a system and method for improved communication between a plurality of robots and a central point.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or Figures that form a part of the present disclosure, and in which are shown, by way of illustration, specific embodiments of one or more of the inventions. It should be appreciated, however, that such features are not limited to usage in the one or more particular embodiments or Figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in Figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card (NIC).

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, a web appliance, a network router, a network switch, a network bridge, any machine capable of executing a sequence of instructions that specify an action to be taken by that machine, and any combinations thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). In one example, a computing device may include and/or be included in a kiosk.

It is to be noted that any one or more of the aspects and embodiments described herein may be conveniently implemented using one or more machines (e.g., one or more specially programmed computing devices that are utilized as a user computing device for an electronic document, one or more server devices, etc.) programmed according to the teachings of the present specification, as will be apparent to those of ordinary skill in the computer art. Appropriate programming instructions can readily be prepared by skilled programmers based on the teachings of the present disclosure, as will be apparent to those of ordinary skill in the programming arts. Aspects and implementations discussed above employing software or software modules (or both) may configure appropriate hardware for assisting in the implementation of the machine executable instructions of the software and/or software module.

Such programming instructions may be a computer program that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory (ROM) device, a random-access memory (RAM) device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. In some embodiments, a basic input/output system (BIOS), including basic routines that help to transfer information between elements within computer system, such as during start-up, may be stored in memory. The memory may also include (e.g., stored on one or more machine-readable media) instructions embodying any one or more of the aspects and/or methodologies of the present disclosure. In other embodiments, the memory may further include any number of program modules including, but not limited to, an operating system, one or more application programs, other program modules, program data, and any combinations thereof. Programming instructions may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU

102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like. Buses 106 may include any of several types of bus structures including, but not limited to, a memory bus, a memory controller, a peripheral bus, a local bus, and any combinations thereof, using any of a variety of bus architectures.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network for connecting the computer system to one or more of a variety of networks and one or more remote devices connected thereto. Examples of a network interface device include, but are not limited to, a network interface card (e.g., a mobile network interface card, a LAN card), a modem, or any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from computer system via the network interface device. Other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Storage device may be connected to the bus by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, the storage device (or one or more components thereof) may be removably interfaced with the computer system (e.g., via an external port connector (not shown)). Particularly, the storage device and an associated machine-readable medium may provide nonvolatile and/or volatile storage of machine-readable instructions, data structures, program modules, and/or other data for computer system. In one example, software may reside, completely or partially, within the machine-readable medium. In another example, software may reside, completely or partially, within the processor. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
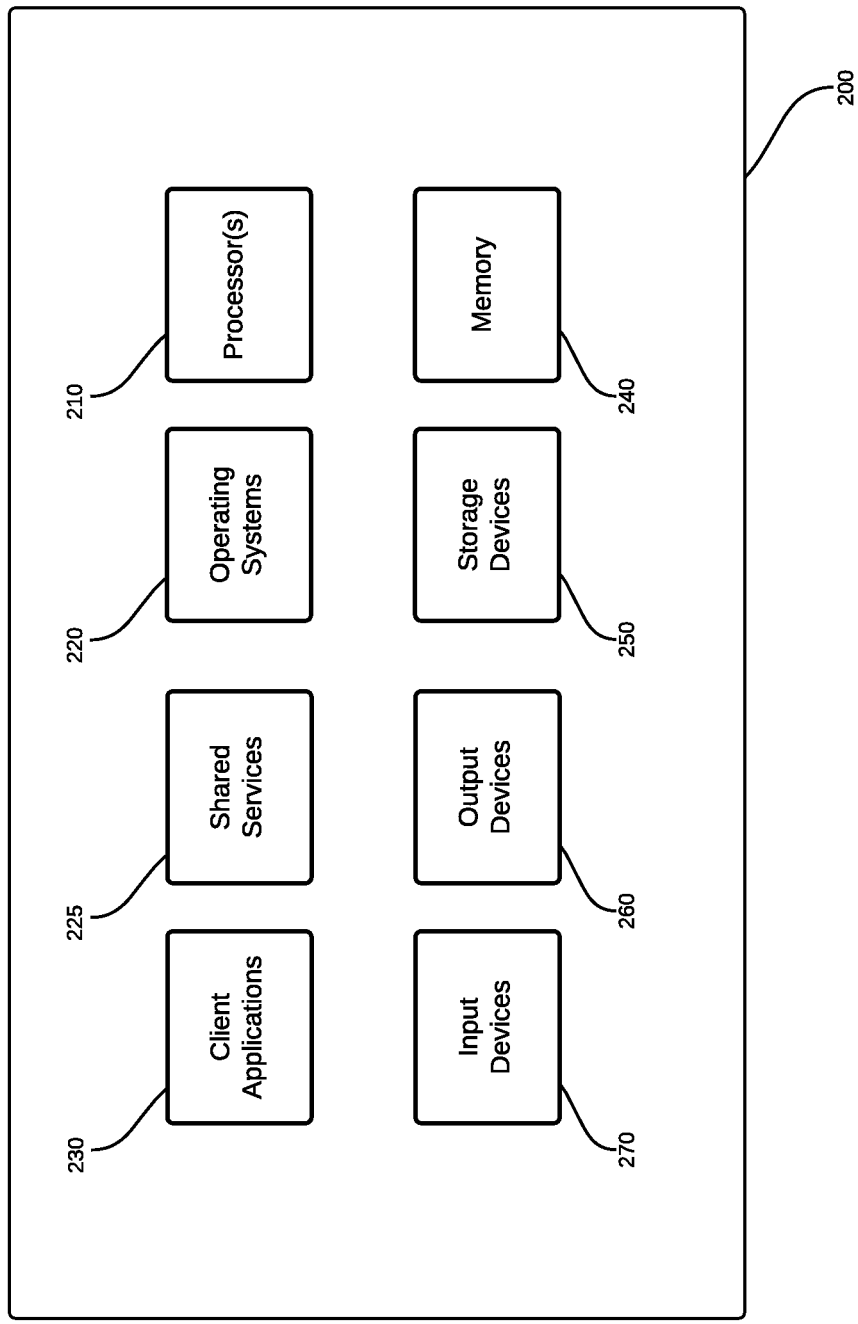
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210.

Input devices 270 may be of any type suitable for receiving user input. In one example, a user of the computer system may enter commands and/or other information into computer system via the input devices 270. Input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 207 may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from a display, discussed further below. The input device may be utilized as a user selection device for selecting one or more graphical representations in a graphical interface as described above.

Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
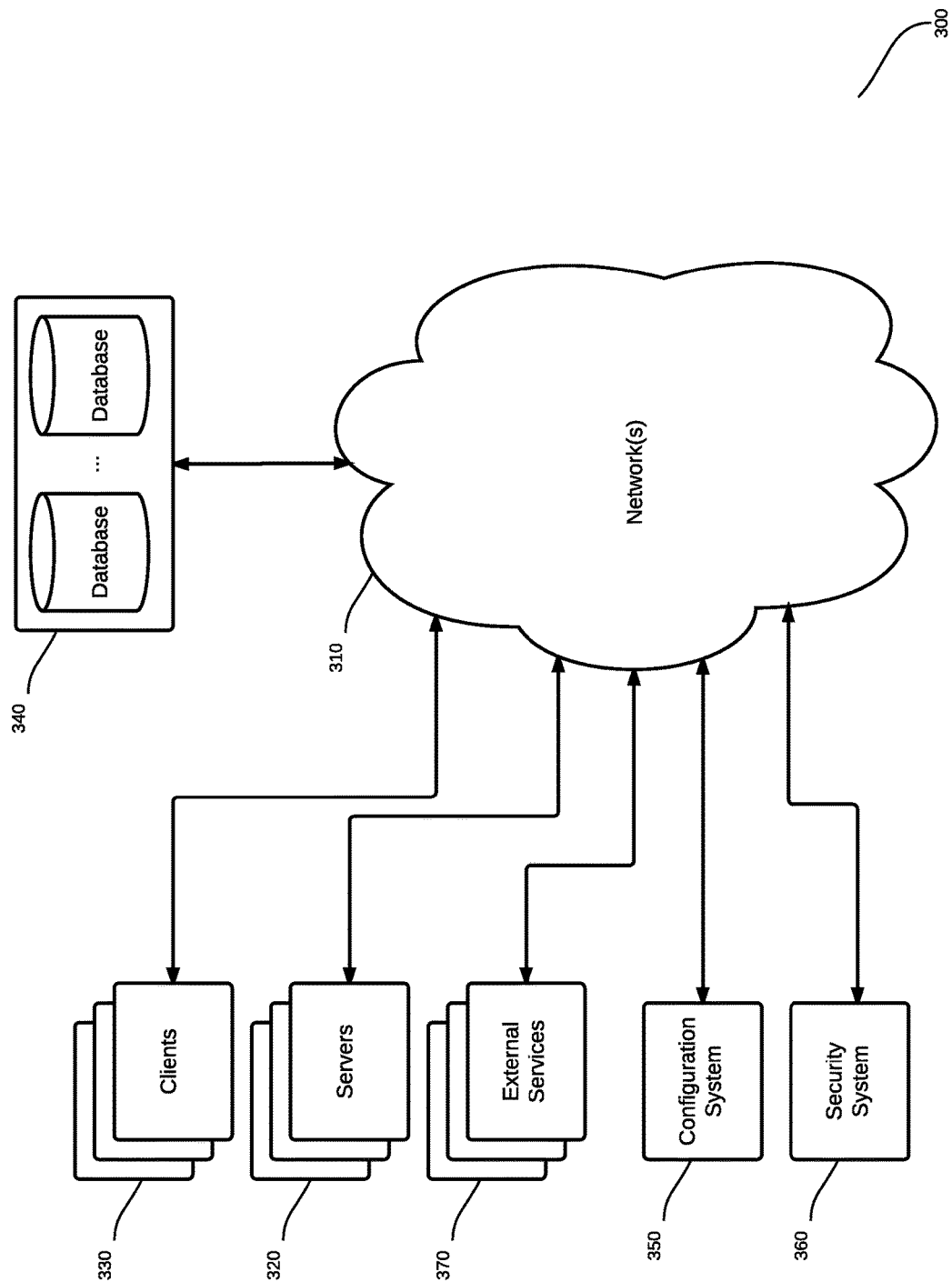
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
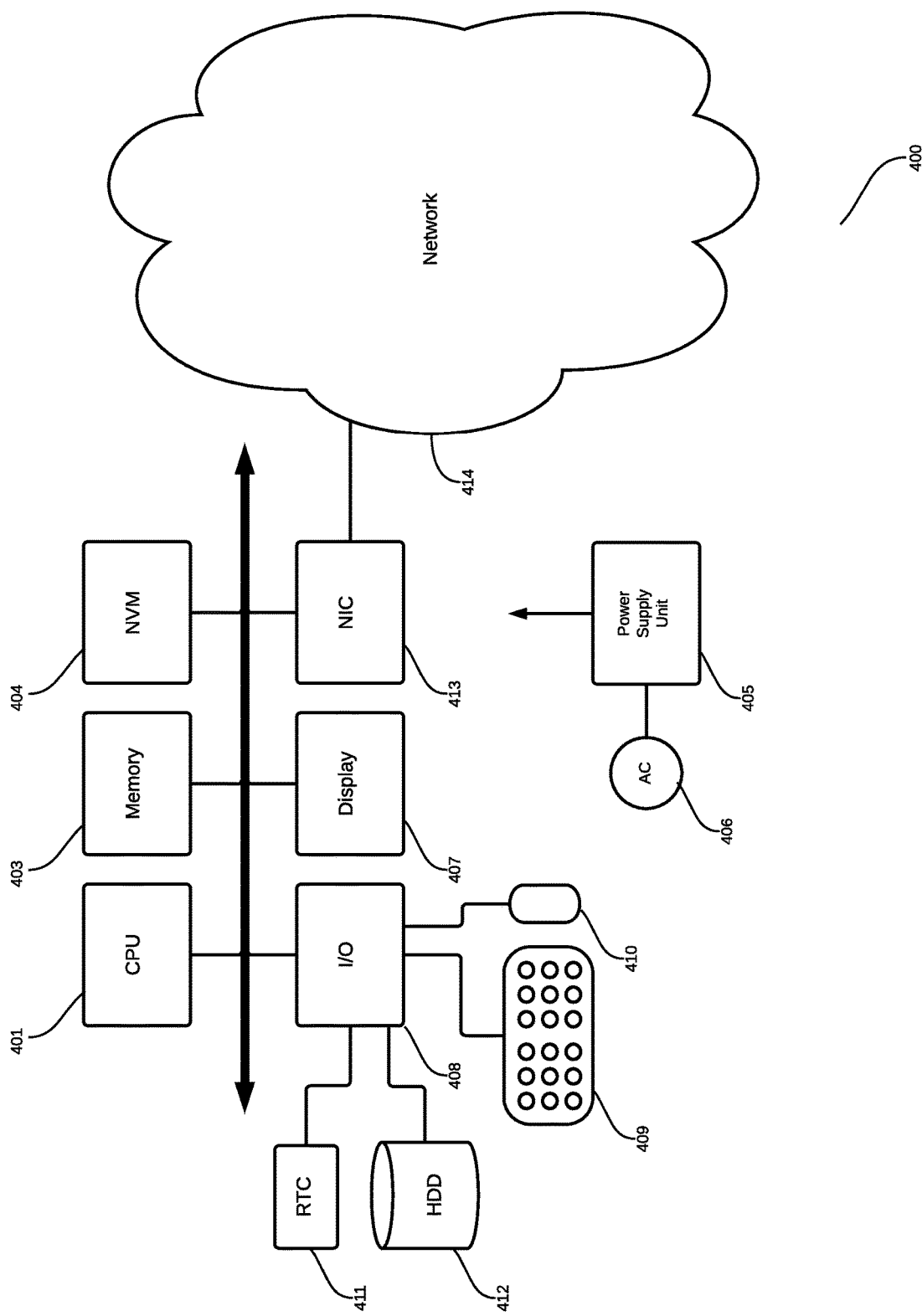
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also, shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Display 407 may comprise an adapter for communicating a displayable image to a display device. Examples of a display device include, but are not limited to, a liquid crystal display (LCD), a cathode ray tube (CRT), a plasma display, a light emitting diode (LED) display, and any combinations thereof. The display adapter and display device may be utilized in combination with the processor to provide graphical representations of aspects of the present disclosure. In addition to a display device, computer system may include one or more other peripheral output devices including, but not limited to, an audio speaker, a printer, and any combinations thereof. Such peripheral output devices may be connected to the bus via a peripheral interface. Examples of a peripheral interface include, but are not limited to, a serial port, a USB connection, a FIREWIRE connection, a parallel connection, and any combinations thereof.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
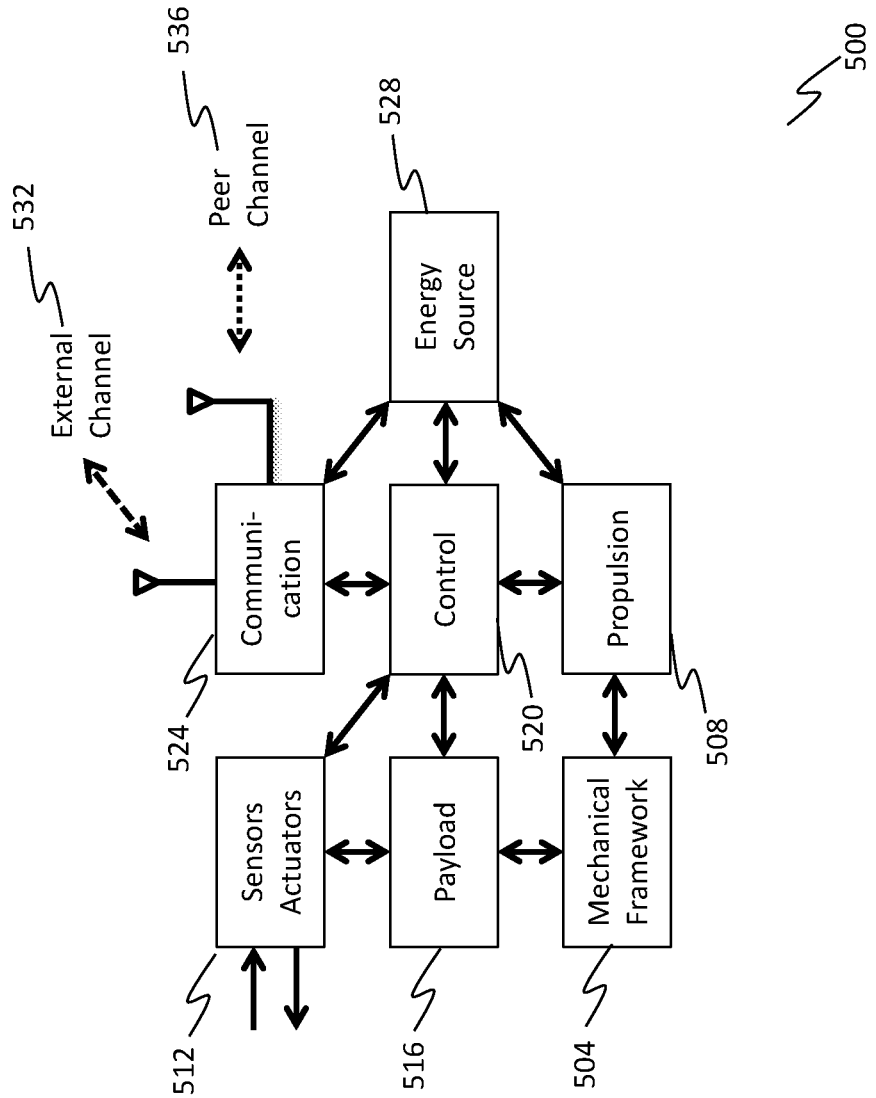
FIG. 5 is an exemplary diagrammatic representation of an exemplary wireless robot system architecture in accordance with aspects of the invention.

With reference to FIG. 5, an exemplary wireless robot system 500 architecture is depicted. Functional elements such as mechanical framework 504, propulsion subsystem 508, and often times payload 516, comprise elements of a wireless robot, and as can be appreciated by one with skill in the art. The instantiation of these elements may be different depending on whether the robot's operating environment is on land, in the air, underground, in water, or in any combination thereof. Propulsion subsystem 508 comprises a source of mechanical power, and means of converting power into propulsive force that may include, but is not limited to, a propeller system, a combustion or electric engine, a turbine, ion thrusters, water-jet, etc. In some embodiments propulsion subsystem 508 comprises a technological system that uses an engine or motor as the power source, and wheels and axles, propellers, or a propulsive nozzle to generate force. In some embodiments, components such as clutches or gearboxes may be added to connect the motor to axles, wheels, or propellers. In other embodiments propulsion subsystem 508 may be driven by balloons (for example whereby lift is generated by helium, hydrogen or some other gas), gliders that may provide lift from a wing arrangement, and other non-motorized methods. Payload 516 may comprise one or more tools or items that may vary depending on the application, product and robot being used and may comprise, for example, networking equipment, mechanical tools such as robotic arms, weapons for military and defense, or other payloads. It should be appreciated that low payload robots may handle up to 16 kg of payload, medium payload robots may handle up to 60 kg of payload, and high payload robots up to 300 kg of payload. In some embodiments, robots may be utilized for large items that may handle payloads up to 1300 kg, or more.

Further shown in FIG. 5 is a control subsystem 520 for coordinating the various elements of the robot, and optional sensors and actuators 512, depending on the operational task of the robot. Sensors 512 may include, but not limited to, optical sensors, video capture devices, atmospheric sensors, carbon dioxide sensors, smoke detectors, radio frequency sensors, or other specialized sensors, or any combination thereof. Actuators 512 may include, but not limited to, levers, mechanical arms, weapons, water delivery means, motor-driven actuators, hydraulic actuators, piston actuators, and the like. Energy source 528 may provide power to the various other elements in the robot system including, but not limited to, electrical, battery hydrogen fuel cell, solar cell, generator, wind turbine, nuclear generator, compressed air, and the like.

In some embodiments, control subsystem 520 continuously stores location information to a location database 101 (or database 120). In addition, various other information is stored that may be associated to location including, but not limited to, connection performance at the particular location. In some embodiments, a last known good location is stored in database 101. In some embodiments, a prioritized list of good locations is stored in database 101. Whereby a good location is defined as a location where an acceptable performance of connection to central point station 505 is at a certain pre-configured level. In some embodiments, a pre-configured level may be dynamic and change due to conditions, for example, environmental conditions or operating conditions. Other information including environmental information such as temperature, pressure, air quality, and the like may be stored and associated to location. In some embodiments, historical information may be stored by control subsystem 520 including, but not limited to, communication from communication subsystem 524. In some embodiments, central point 505 may be a base location. In another embodiment, central point 505 may comprise a plurality of robots. In another embodiment, central point 505 may comprise a mobile wireless communication point.

Further shown in FIG. 5, is communication subsystem 524 enabling the robot to communicate to other robots or devices, using a variety of wireless communication methods (for example, WiFi™, Cellular, short-range interconnected device protocol, and the like) as described previously. In some embodiment, communications may be wired. Communication subsystem 524 may communicate with external channel 504, for transporting various types of information (as outlined previously) between a robot and central point station 716 (referring to FIG. 7) or for communications to other components. Communication subsystem 524 may also include, a means for communicating with peer channel 536, which may facilitate information transport such as, location info, relative position, system status, information form external channels, information from service channels, information form sensors, information to actuators between other robots working within that team. Communication subsystem 524 may also include, a means for communicating with external channel 504. In some embodiments, communications with external channel 504 and peer channel 609 may be embodied within the same equipment or device. In some embodiments, peer channels may perform the function of external channels, and vice versa. In some embodiments, peer channels and external channels are the same.

Figure 6:
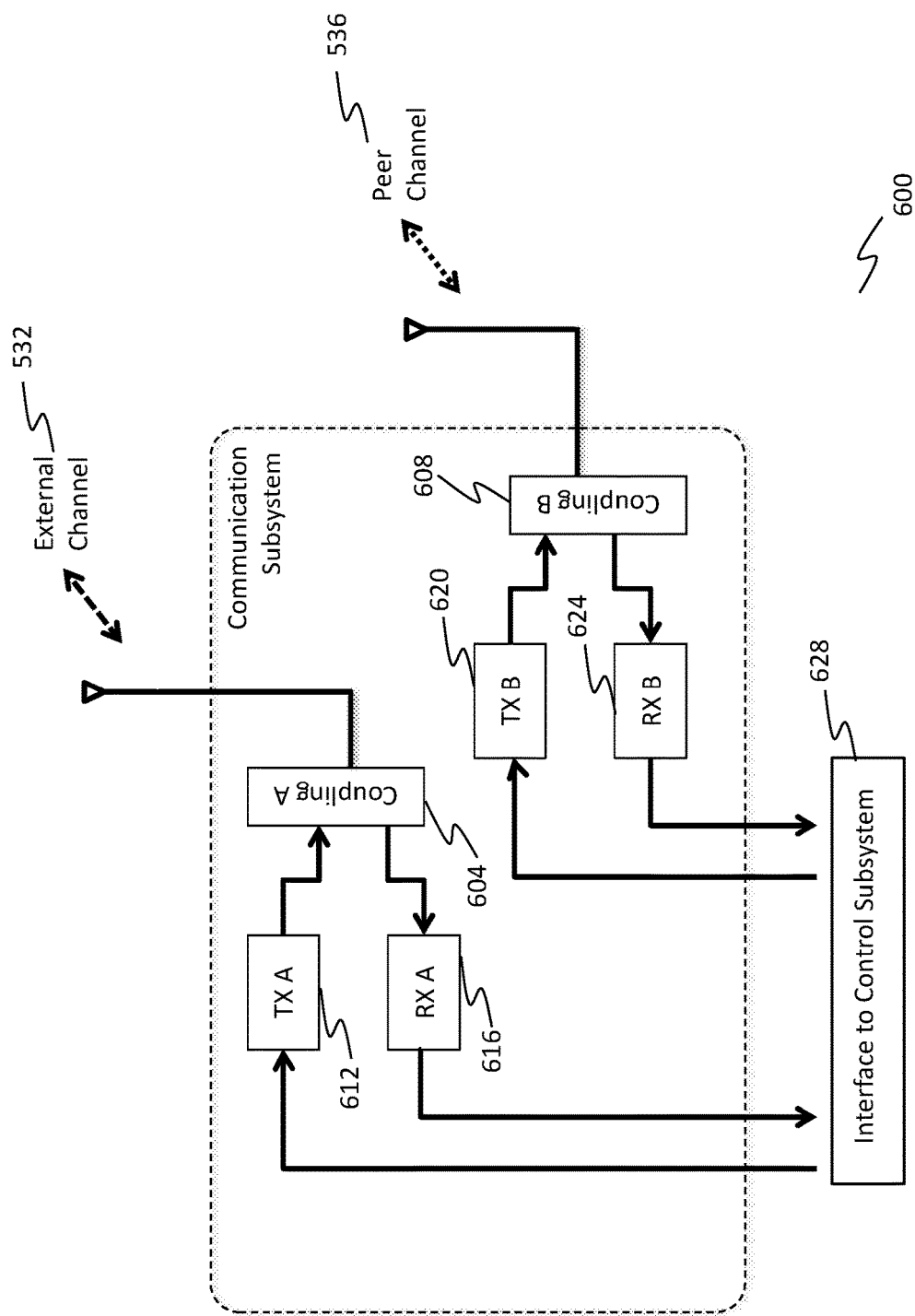
FIG. 6 is an exemplary diagrammatic representation of an exemplary communication subsystem of FIG. 1 in accordance with aspects of the invention.

Referring now to FIG. 6, a communication subsystem 600 is illustrated. Communication subsystem 600 may be an embodiment of communication subsystem 524, pictured in FIG. 5. A commination subsystem 600 may include an external channel 532 including a wireless interface means. For example, if a radio frequency (RF) was the type of communication signal then external channel 532 may include an RF antenna or if the type of communication was WLAN, then an appropriate wireless interface means may be used. These are provided only for example and are not meant to be limiting. There are many types of communication methods and/or signals that may be used easily in embodiments of the disclosure and a person of skill in the art will readily recognize those after reading this disclosure in its entirety. Communication subsystem 600 may include a coupling A 604 and may further include a coupling B 608. couplings A 604 and coupling B 608 may support simultaneous transmission and reception of wireless signals and may include filtering functionality. Types of filtering may vary based on which type of communication utilized. For example, for wireless transmission, or communication, this may include filtering for spurious emission. in another example, for wireless reception, this may include filtering for band blocking signals. These types of filtering are provided only for examples of types of filtering, and the types of filtering that may be used in accordance with embodiments of the disclosure are not limited to these examples. after reading this disclosure in its entirety, a person of skill in the art will readily appreciate the types of filtering that may be implemented with aspects of the disclosure.

With continued reference to FIG. 6, additionally, or alternatively, coupling A 604 and coupling B 608 may support other wired forms of communication signals as well. Shown here, TX A 612 (transmit block) and an RX A 616 (receive block) are operatively or communicatively connected to coupling A 604 and TX B 620 (transmit block) and an RX B 624 (receive block) are operatively or communicatively connected to coupling B 608 and an interface to control subsystem. Interface to control subsystem 628 may be analog or digital and a determination on whether to use analog or digital may depend on the desired implementation of communication subsystem 600. Wireless robot system 500 may communicate, via peer channel 536, to other wireless robots 500 operating locally or remotely as part of a team. External channel 532 and peer channel 536 are both capable of implementing any of a number of wireless interface forms of communication. In an embodiment, external channel 532 and peer channel 536 could each support the same wireless interface means, or different interface means. Additionally, or alternatively, one coupling could support external channel 532 and peer channel 536, obviating the need for two separate couplings, like coupling A 604 and coupling B 608. Furthermore, although a single Interface to control subsystem 628 is shown, it may be desirable for multiple interfaces to the control subsystem 628. For example, external channel 532 and peer channel 536 may each be operatively or communicatively connected with two different respective interfaces to a control subsystem. In some embodiments, processing information from external channels, peer channels, or both, is performed by the control subsystem in conjunction with, or instead of the communication module 524.

Figure 7:
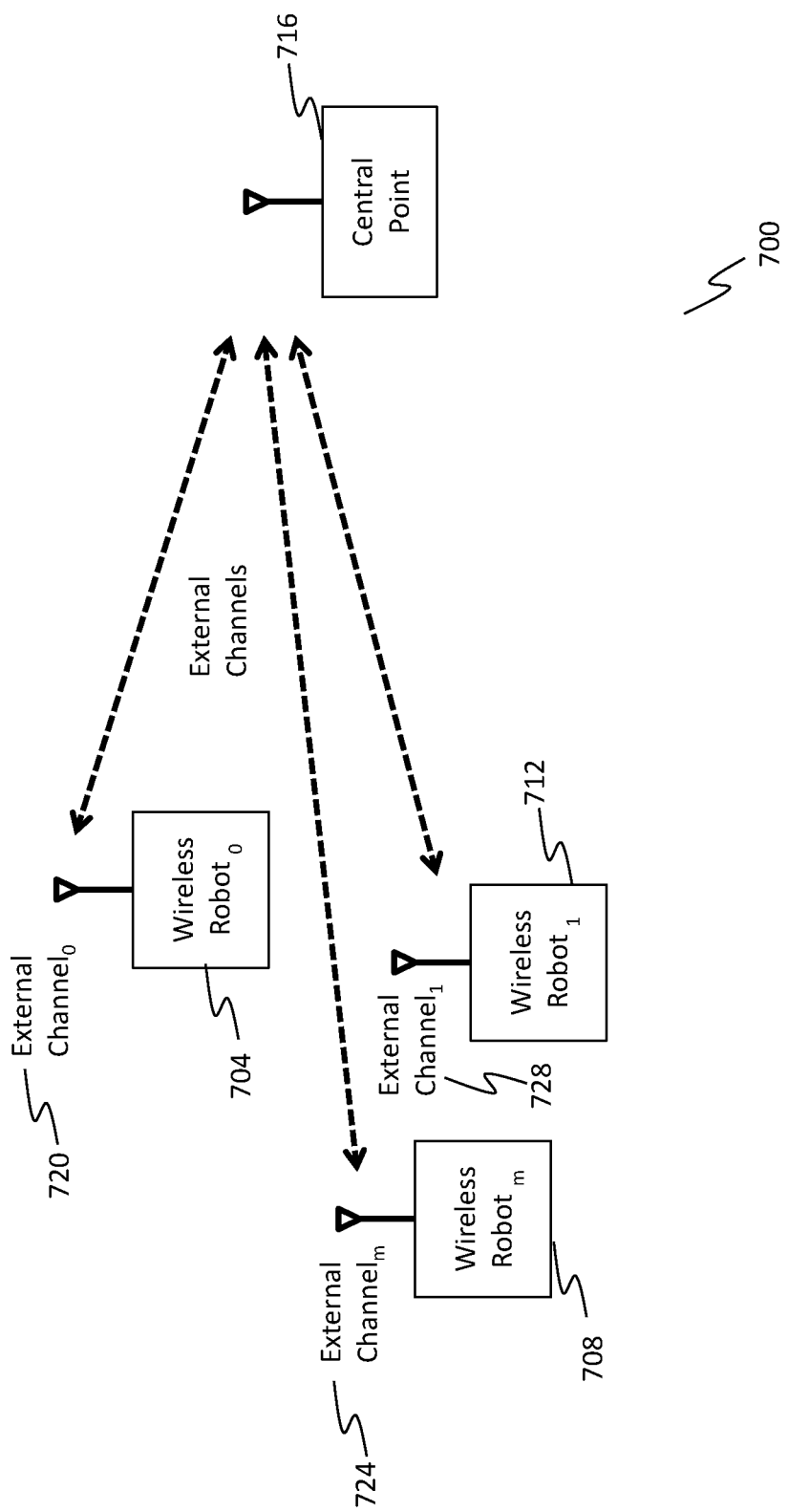
FIG. 7 is an exemplary diagrammatic representation of an exemplary "m" robots communicating with a central point using external channels in accordance with aspects of the invention.

FIG. 7 illustrates a "m" robots communicating with a central point using external channels 700 including wireless robot 0 704, wireless robot m 708, wireless robot 1 712, where all of the aforementioned robots are capable of communication with a central point 716 via external channel 0 720, External Channel m 724, and External Channel 1 728 respectively. Wireless robot 0 704 wireless robot m 712, and wireless robot 1 716 may have the capabilities of that shown in FIG. 5, and described previously with reference to FIGS. 5-6. External channel 0 720, external channel m 724, and external channel 1 728 may be, but are not limited to transporting, receiving or transmitting information. In an embodiment shown here in FIG. 7, each of wireless robot 0, wireless robot m, and wireless robot 1 is processing information independently through its own communications subsystem, like communication subsystem 524. The means for supporting these external channels have been described in detail in previous sections.

Figure 8:
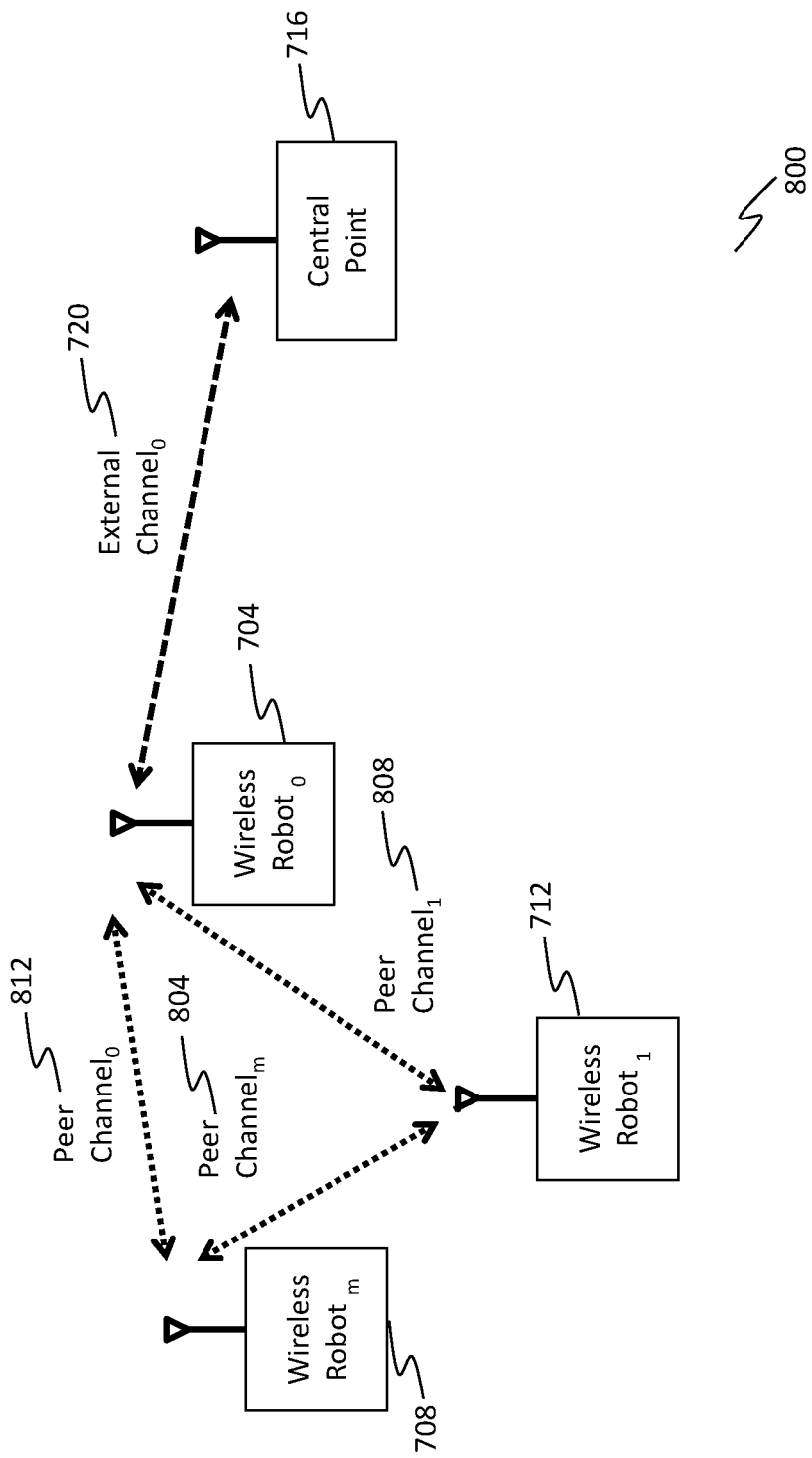
FIG. 8 is an exemplary diagrammatic representation of a robotic system whereby "m" robots communicate with a base location using an external channel plus peer channels, according to an embodiment of the invention.

Referring now to FIG. 8, which illustrates an embodiment of a robotic system including wireless robot m 708, wireless robot 1 712, and wireless robot 0 704 communicating with a central point, which may be similar to that described with reference to FIG. 7, using external channel 0, peer channel m 804, peer channel 1 808 and peer channel 0 812. Robotic system 800 shows a more efficient means of communication between a plurality of wireless robots and a central point 716. In an embodiment, wireless robot m 708, wireless robot 1 712, and wireless robot 0 704 may communicate with one another via peer channel m 804, peer channel 1 808 and peer channel 0 812. The types of information communicated may include control information, telemetry information, and content information. The nature and the content of this information communicated by wireless robot m 708, wireless robot 1 712, and wireless robot 0 704 may be dependent on a specific application of robotic system 800.

Additionally, wireless robot 0 704 may be in communication with central point 716, as shown in FIG. 8, over external channel 0 720. Information transported or communicated over the external channel 0 720 may include control information, telemetry information, and content information. This information transported or communicated over the external channel 0 may be targeted for wireless robot 0 704, or it may be targeted for wireless robot m 708 and/or wireless robot 1 712. It is noted that that although only three wireless robots are shown in FIG. 8 that any appropriate number of wireless robots may be used in embodiments of robotic system 800.

Information targeted for wireless robot 0 704 from central point 716 may be processed by a communications subsystem 524 of wireless robot 0, such as communication subsystem of FIG. 5 and communication subsystem 600 of FIG. 6. Information targeted for other wireless robots of robotic system 800 may be further transported or communicated over the appropriate peer channel. For instance, if information communicated from central point 716 to wireless robot 0 404 includes information for wireless robot 1 712 then that information would be communicated over peer channel 1 808. This process may be described with reference to Communication subsystem 600 of FIG. 6. For example, forward link information (central point to a wireless robot) on external channel 532 would be processed by communications subsystem of wireless robot 0 704, utilizing coupling and RX blocks associated with external channel 532. Continuing with this example, this information may be forwarded to a control subsystem 520. Control subsystem 520 may determine that information was not targeted for wireless robot 0 704, and the control subsystem may forward the information back to communications subsystem over interface to control subsystem 628 associated with peer channel. An appropriate indication would be made to designate which of the "m" wireless robots the information was targeted for. Continuing the example, communications subsystem 524 may then utilize coupling and TX blocks associated with peer channel 536 to forward the information appropriately.

Multiple peer channels are depicted as part of robotic system 800 in FIG. 8 but these are for ease of the reader understanding. There may be one peer channel over which wireless robot m 708, wireless robot 1 712, and wireless robot 0 704 use to communicate with one another and any of the wireless robot m 708, wireless robot 1 712, and wireless robot 0 704 may communicate with the other. For instance, robotic system 800 of FIG. 8 does not show that wireless robot m 708 and wireless robot 1 712 communicate directly with central point 716 but this may be possible. A person of skill in the art after reading this disclosure in its entirety will readily appreciate the number of possible ways that wireless robots of a robotic system 800 may communicate with one another using peer channels.

Additionally, or alternatively, reverse link information (wireless robot to central point) may be processed conversely. For example, and with continued reference to FIGS. 6-8, wireless robot m 708, wireless robot 1 712, and wireless robot 0 704 may transport the information over peer channel m 804, peer channel 1 808 and/or peer channel 0 812 and it may be received by wireless robot 0 704, with an appropriate indication that the information is targeted for central point 716. Communications subsystem 524 of wireless robot 0 704 may process this information at coupling and RX blocks associated with peer channel m 804, peer channel 1 808 and peer channel 0 812, and may communicate or forward that information to control subsystem 520. Continuing with same example, after it is determined that information was not targeted for wireless robot 0 704, control subsystem 520 may communicate or forward the information back to communications subsystem 524 over an interface to control subsystem 628 associated with external channel 0 720. Communications subsystem 524 may then forward or communicate the information to central point 716 via coupling and TX blocks associated with the external channel 0 720.

Figure 9:
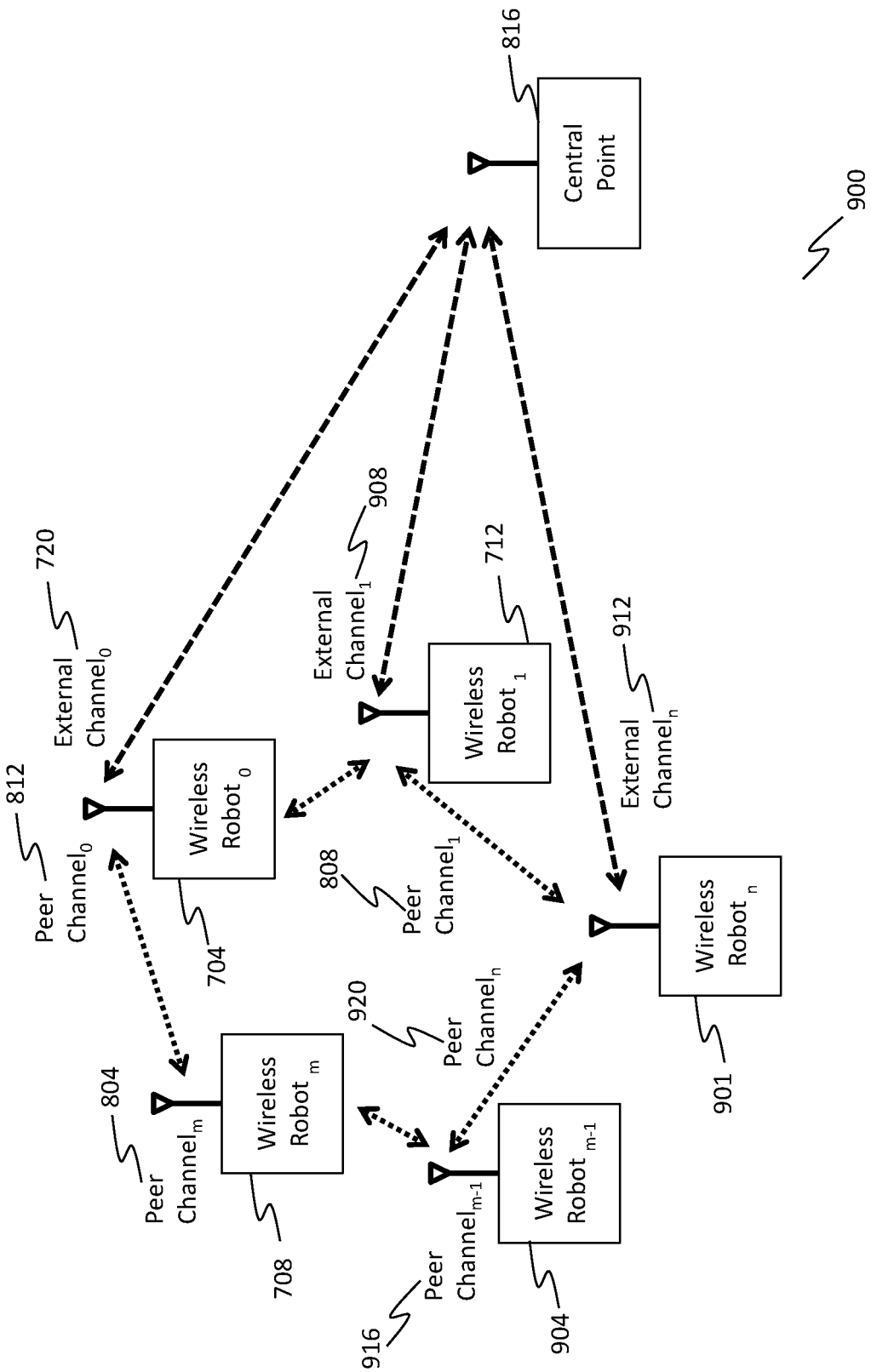
FIG. 9 is another exemplary diagrammatic representation of a robotic system whereby "m" robots operating with "n" robots communicating with a base location, according to an embodiment of the invention.

Referring now to FIG. 9, which illustrates another exemplary embodiment of a robotic system including wireless robot n 901, wireless robot 1 712, wireless robot 0 704, wireless robot m 708, and wireless robot m–1 904 communicating with central point 716. In an exemplary embodiment of robotic system 800 shown here, wireless robot n 901, wireless robot 1 712, and wireless robot 0 704 may communicate with central point 716 over external channel 0 720, external channel 1 908 and external channel n 912. Additionally, wireless robot n 901, wireless robot 1 712, wireless robot 0 704, wireless robot m 708, and wireless robot m–1 904 may communicate with one another over peer channel m 904, peer channel 1 808 and peer channel 0 812, peer channel m–1 916 and peer channel n 920. Multiple peer channels are depicted as part of robotic system 800 in FIGS. 8-9 but these are for ease of the reader understanding. There may be one peer channel over which all the wireless robots of robotic system use to communicate with one another and any of the wireless robots. Exemplary embodiments provided in FIGS. 8-9 are just that, examples, and the number of wireless robots comprising a robotic system may be any number appropriate and all or some of those wireless robots may communicate with one another via peer channel(s). A person of skill in the art after reading this disclosure in its entirety will readily appreciate the number of possible ways that wireless robots of a robotic system may communicate with one another using peer channels.

Still with reference to FIG. 9, wireless robot n 901, wireless robot 1 712, and wireless robot 0 704 may be referred to herein as a subset of robots or subset of "n" wireless robots. With reference to FIG. 8, the subset of robots was wireless robot 0 704. Referring again to FIG. 9, a subset of wireless robots that may be in communicative contact with central point 716 via external channel 0 720, external channel 1 908 and external channel n 912; however, it is noted that the number of wireless robots utilizing external channels to communicate with a central point that are included in robotic system 800 may be as small as one but may also be any appropriate number greater than one. For example, robotic system 800 may include six wireless robots and only one, for example, may be in direct communication with a central point via an external channel and this one wireless robot may communicate information to the other five wireless robots via peer channels and may receive information from the other five wireless robots via peer channels, which may be communicated back to central point 716. In another example, a robotic system 800 may include six wireless robots and all six may be in direct communication with a central point 716 via external channels. It can be seen that this system of communication, wherein a subset of wireless robots are communicating over external channels, may provide diversity, robustness, and redundancy. Additionally, or alternatively, reverse link information (wireless robot to central point) may be processed conversely.

With continued reference to FIG. 9, information for multiple of wireless robot n 901, wireless robot 1 712, wireless robot 0 704, wireless robot m 708, and wireless robot m−1 904 may be transported and/or communicated over external channel 0 720, external channel 1 908 and external channel n 912. With reference to FIG. 6 and FIG. 9, utilizing communications subsystem 524, information from external channel 0 720, external channel 1 908 and external channel n 912 targeted for wireless robot m 708, and wireless robot m−1 904 can be forwarded to that targeted wireless robot, by the wireless robot processing a signal on a given external channel. For example, utilizing a communications subsystem, information from a given external channel, targeted for a given wireless robot can be forwarded to that targeted wireless robot, by the wireless robot processing the signal on the given external channel. By carefully assigning information targeted for a given wireless robot across an external channel, a robotic system 800 will have improved robustness and redundancy properties. In another example, and with continued reference to FIG. 9, if one of the wireless robots of robotic system 800 in communication with central point 716 were to fail, or conditions on one of the external channels were to degrade, or fail, information for all wireless robots could still be supported over the remaining external channels being processed by the remaining wireless robots, originally of the subset of robots. In some embodiments, operations of robots may be made redundant to handle failed units.

In an example, and with reference to FIGS. 8-9 robotic system 800 may be capable to provide spatial and time diversity of the information delivered to any of the wireless robots. Continuing with the example, one may advantageously assign information for a given wireless robot to multiple external channels, which will be processed by multiple wireless robots, such wireless robots occupying a different point in space. Due to well know wireless channel characteristics associated with propagation and multipath fading, these multiple external channels will have different, and diverse, transmission characteristics. Any wireless robots may advantageously process these diverse signals to achieve diversity gain.

Figure 10:
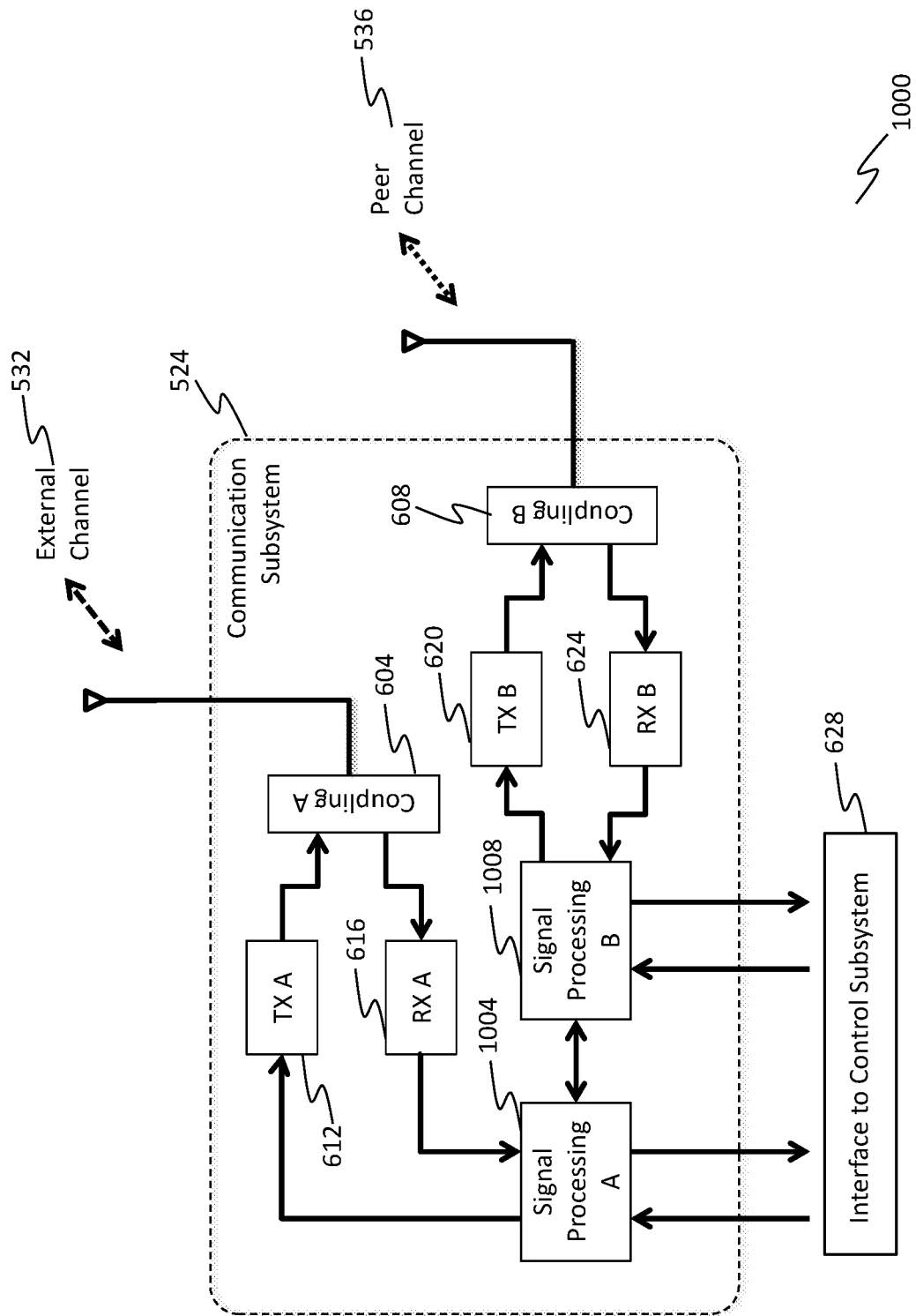
FIG. 10 is an exemplary diagrammatic representation of an enhanced communication subsystem in accordance with aspects of the invention.
Figure 11:
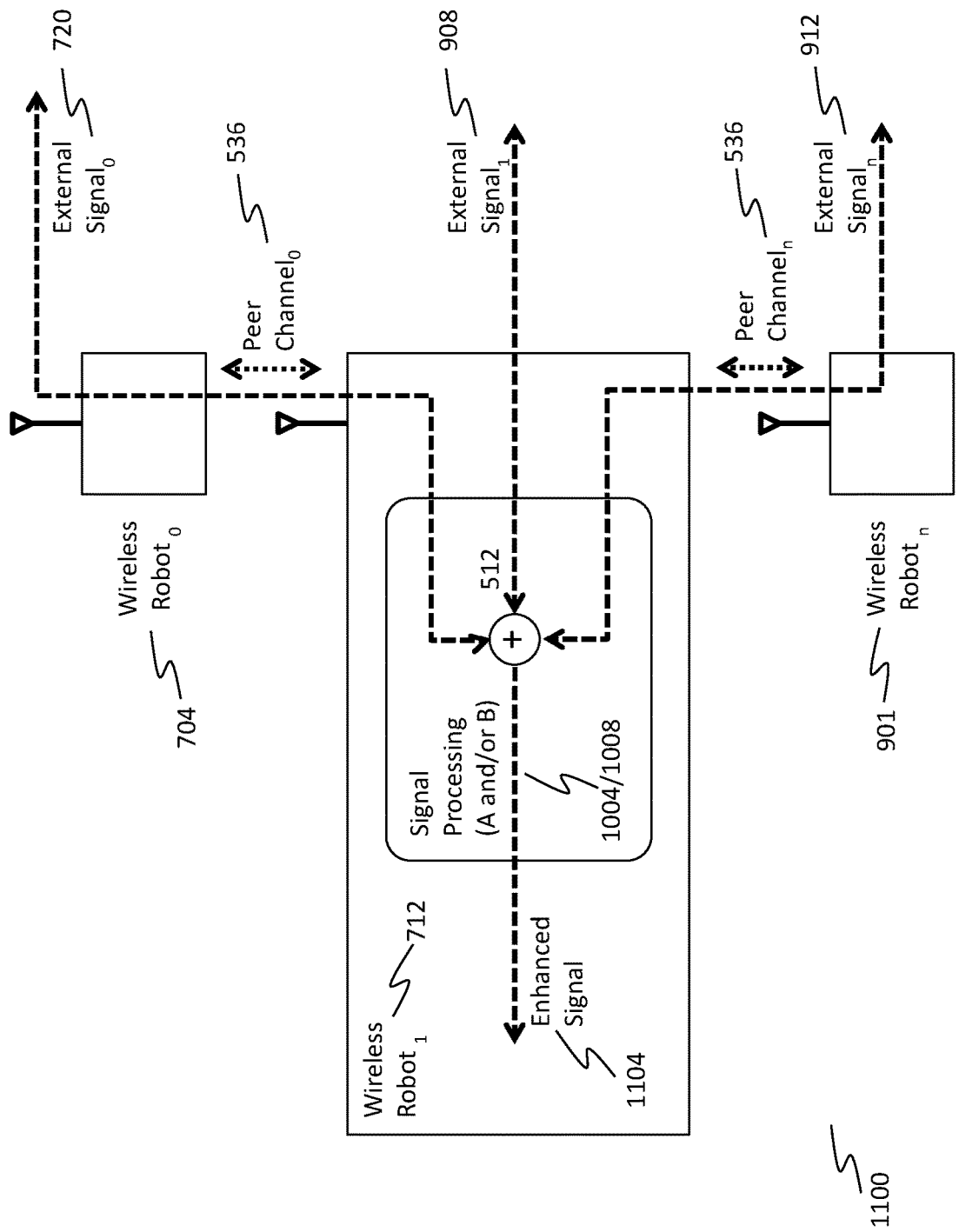
FIG. 11 is an exemplary diagrammatic representation of power combining of "n" external signals in accordance with aspects of the invention.

Referring now to FIG. 10, an enhanced communication subsystem 1000 is illustrated. Enhanced communication subsystem 1000 may be in place at communication subsystem 524 or is an example of communication subsystem 524, pictured in FIG. 5. Enhanced commination subsystem 1000 may include an external channel 532 including a wireless interface means. For example, if a radio frequency was the type of communication signal then external channel 532 would include an RF antenna or if the type communication was WLAN, then an appropriate wireless interface means may be used. These are provided only for example and are not meant to be limiting. There are many types of communication methods and/or signals that may be used easily in embodiments of the disclosure and a person of skill in the art will readily recognize those after reading this disclosure in its entirety. Enhanced communication subsystem 1000 may include a coupling A 604 and may further include a coupling B 608. Couplings A 604 and coupling B 608 may support simultaneous transmission and reception of wireless signals and may include filtering functionality. Types of filtering may vary based on which type of communication utilized. For example, for wireless transmission, or communication, this may include filtering for spurious emission. In another example, for wireless reception, this may include filtering for band blocking signals. These types of filtering are provided only for examples of types of filtering, and the types of filtering that may be used in accordance with embodiments of the disclosure are not limited to these examples. A person of skill in the art will readily appreciate the types of filtering that may be implemented with aspects of the disclosure. Additionally, or alternatively, coupling A 604 or coupling B 608 may support other wired forms of communication signals too.

With reference to FIG. 10, a TX A 612 (transmit block) and an RX A 616 (receive block) may be operatively or communicatively connected to coupling A 604 and to signal processing A 1004, which may be operatively or communicatively connected to interface to control subsystem 628. A TX B 620 (transmit block) and an RX B 624 (receive block) may be operatively or communicatively connected coupling B 608 and to signal processing B 1008, which may be operatively or communicatively connected to interface to control subsystem 628. Signal processing A 1004 and signal processing B 1008 may be capable of digital or analog processing of information transported or communicated over external channel 632 or peer channel 636. Signal processing A 1004 and signal processing B 1008 may be operatively or communicatively connected to control subsystem 520 via interface to control subsystem 628. Interface to control subsystem 628 may be analog or digital and a decision whether to use analog or digital may depend on a desired implementation of enhanced communication subsystem 1000.

Still referring to FIG. 10 and for example, for particular applications of robot system 800 it may be advantageous for signal processing A 1004 and/or signal processing B 1008 to not process information but rather communicate that information directly to control subsystem 520. Enhanced communication subsystem 1000 may include a peer channel 536 in addition to external channel 532. Peer channel 536 may be used for wireless robots to communicate with other wireless robots operating. external channel 532 and peer channel 536 are both capable of implementing any of a number of wireless interface means. In an embodiment, external channel 532 and peer channel 536 could each support the same wireless interface means, or different interface means. Additionally, or alternatively, one coupling could support external channel 532 and peer channel 536, obviating the need for two separate couplings, like coupling A 604 and coupling B 608 and also obviating the need for two separate signal processors, like signal processing A 1004 and signal processing B 1008. Furthermore, although a single Interface to control subsystem 628 is shown here, it may be desirable for multiple interfaces to the control subsystem. For example, signal processing A 1004 and signal processing B 1008 may each be operatively or communicatively connected with two different respective interfaces to a control subsystem, not shown in FIG. 10. It is noted that signal processing A 1004 and signal processing B 1008, each have a bidirectional interface to the other, enabling exchange of processing information between the two. Additionally, signal processing A 1004 and signal processing B 1008 may provide a single signal processor. Additionally, or alternatively, reverse link information (wireless robot to central point) may be processed conversely.

In some embodiments, information exchanged with the central point utilizing external channels is pre-processed prior to communication among the plurality of wireless robots utilizing peer channels, that is, based on characteristics of the information, the information may be processed such that communicated information uses advanced techniques to enable a more efficient communication of the information as described herein.

In the following paragraphs a more detailed description is given for methods and systems of the disclosure whereby such an enhanced communications subsystem is used in accordance with systems and methods of the instant application. These novel methods provide enhanced performance and capabilities over systems known in the art. The techniques described herein may be advanced communication techniques or the techniques described herein below in combination with aspects of systems and methods of this disclosure may be advanced communication techniques.

Power Combining

With reference to FIG. 9, where "m" wireless robots may be operating as part of robotic system 800 and where "m" is the number of robots operating as part of robotic system 800, and with a subset of "n" wireless robots communicating with central point 716 over "n" external channels. Additionally, "m" wireless robots communicate with one another utilizing peer channels.

Now referring to aspects of FIGS. 5, 9-10 and 11, FIG. 11 illustrates an example of power combining of "n" external signals 1100 which are being communicated over the "n" external channels. A variety of information may be carried over these signals and may include, but is not limited to, control information, telemetry information, and content information. In an illustrative example provided in FIG. 11, wireless robot 1 712 is performing power combining of external signals from the "n" external channels. Information carried over external channel 1 908, may be received directly by wireless robot 1's communications subsystem, and forwarded to corresponding signal processing (signal processing A 1004 if received by an external channel or by signal processing B 1008 if received by a peer channel). With continued reference to FIG. 11, and aspects of previous figures, information carried over external channel 0 720 may be received by wireless robot 0 704 and forwarded to wireless robot 1 712 utilizing a corresponding peer channel. Information carried over external channel n 912 may be received by wireless robot n 901 and utilizing a corresponding peer channel communicated to wireless robot 1 712. Information received from the "n" external channels and peer channels, may now be in signal processing A 1004 or signal processing B 1008 or both of wireless robot 1 712, are processed in accordance with power combining techniques and an enhanced signal 1104 may be transmitted from signal processing A 1004 or signal processing B 1008 or both. It can be readily appreciated that enhanced signal 1104, being available within wireless robot 1 712, can readily be distributed among any or all of the plurality of "m" wireless robots in embodiments of robotic system 800, utilizing methods and systems previously described for operation of peer channels. Additionally, or alternatively, reverse link information (wireless robot to central point) may be processed conversely.

MIMO Combining

Figure 12:
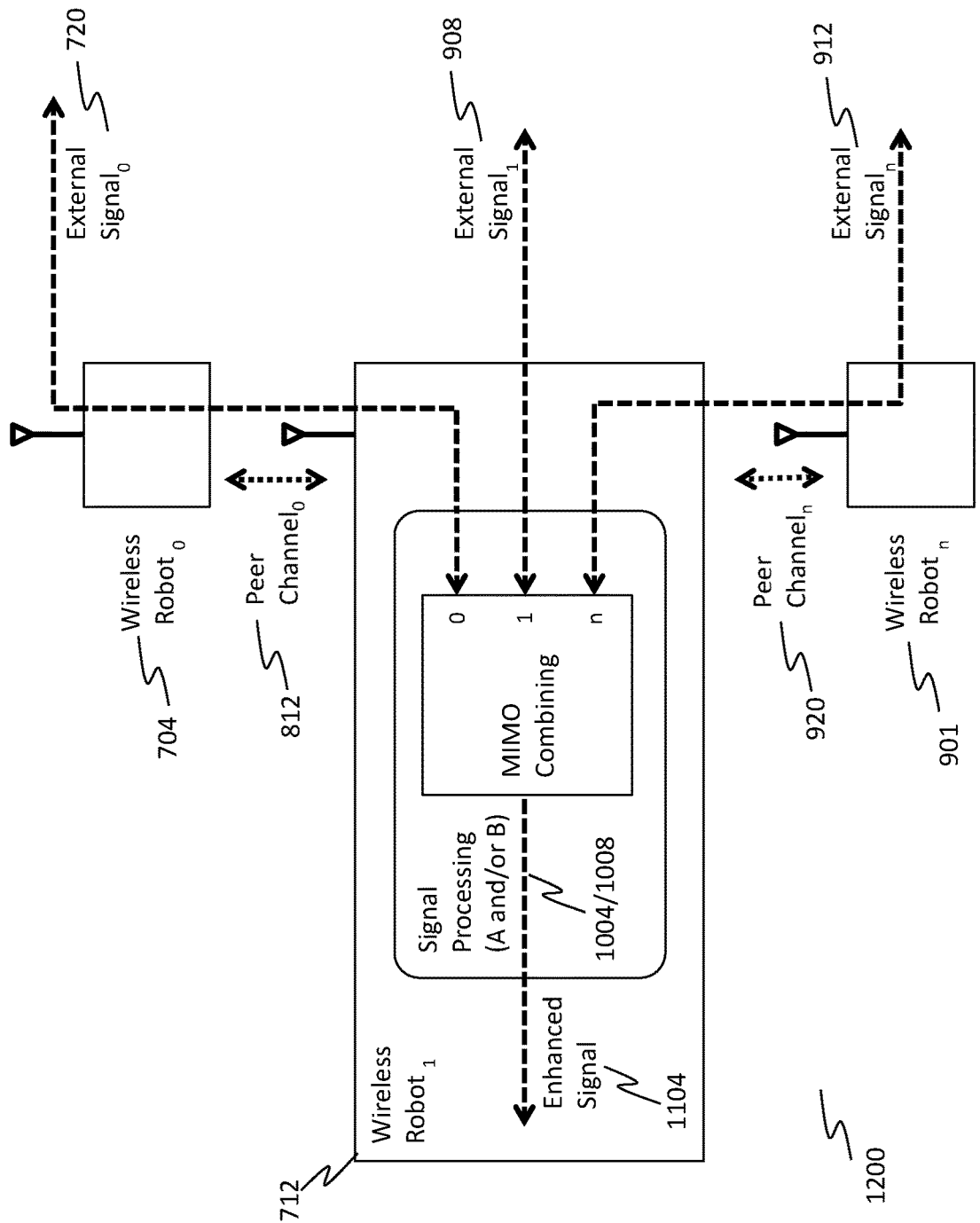
FIG. 12 is an exemplary diagrammatic representation of MIMO combining of "n" external signals in accordance with aspects of the invention.

Referring now to FIG. 12 with reference to methods and systems previously provided in the instant disclosure, a multiple in multiple out (MIMO), an exemplary MIMO combining of "n" external signals 1200 is provided as another advanced communication technique alone or in combination with methods and systems presented previously for a robotic system 800. MIMO combining of "n" external signals 1200 includes information carried over external channel 0 720 may be received by wireless robot 0 704 and forwarded to wireless robot 1 712 utilizing a corresponding peer channel (signal processing A 1004 if received by an external channel or by signal processing B 1008 if received by a peer channel). Information carried over external channel 1 908, may be received directly by wireless robot 1's communications subsystem, and forwarded to corresponding signal processing (signal processing A 1004 if received by an external channel or by signal processing B 1008 if received by a peer channel). Information carried over external channel n 912 may be received by wireless robot n 901 and utilizing a corresponding peer channel communicate information to wireless robot 1 712. Information received from the "n" external channels and peer channels, which may now be in signal processing A 1004 and/or signal processing B 1008 of wireless robot 1, are processed in accordance with MIMO processing techniques and an enhanced signal 1100 may be transmitted from signal processing A 1004 or signal processing B 1008 or both. It can be readily appreciated that enhanced signal 1100, being available within wireless robot 1 712, can readily be distributed among any or all of the plurality of "m" Wireless Robots in embodiments of robotic system 800, utilizing methods and systems previously described for operation of peer channels. Additionally, or alternatively, reverse link information (wireless robot to Central Point) may be processed conversely.

Using MIMO combining of "n" external signals 1200 in robotic system 800 may utilize advantageous spatial separation between the subset of "n" wireless robots. Said spatial separation of the communications subsystems 524 of these wireless robots may provide spatial and temporal diversity of information carried on the "n" external channels. utilizing MIMO combining of "n" external signals 1200 in robotic system 800, the information carried on "n" external channels may be advantageously combined, producing an enhanced signal 1104. MIMO combining of "n" external signals 1200 in robotic system 800 may result in an information stream with improved characteristics, such as increased data rates, reduced error probability, and potentially increased effective communication distance to central point 716.

As noted above MIMO combining of "n" external signals in robotic system 1200 may provide increased data rates. For example, consider an undersea monitoring application, where sound navigation and ranging (SONAR) information may be collected for monitoring seagoing traffic of one type or another. In an example, "m" wireless robots might be collecting SONAR information, with a subset "n" wireless robots communicating this information over external channels to central point 716, such as, a submarine, for example. The capacity for information communicated utilizing external channels may be limited by electromagnetic wave propagation, and a fundamental capacity of each external channel. Consider an example however, where higher resolution of the SONAR information is required in order to more accurately monitor and track said seagoing traffic. This higher resolution SONAR information may require increased channel capacity.

Continuing the example above and with continued reference to systems and methods disclosed in the instant application, given that "n" wireless robots may be spatially separated, one can understand that there may be temporal diversity in signals communicated over external channels, as well as spatial diversity in said signals. Systems and methods disclosed in the instant application account for temporal and spatial diversity of such a system, and apply an appropriate pre-coding and combining associated with MIMO techniques.

Antenna Array Processing

Figure 13:
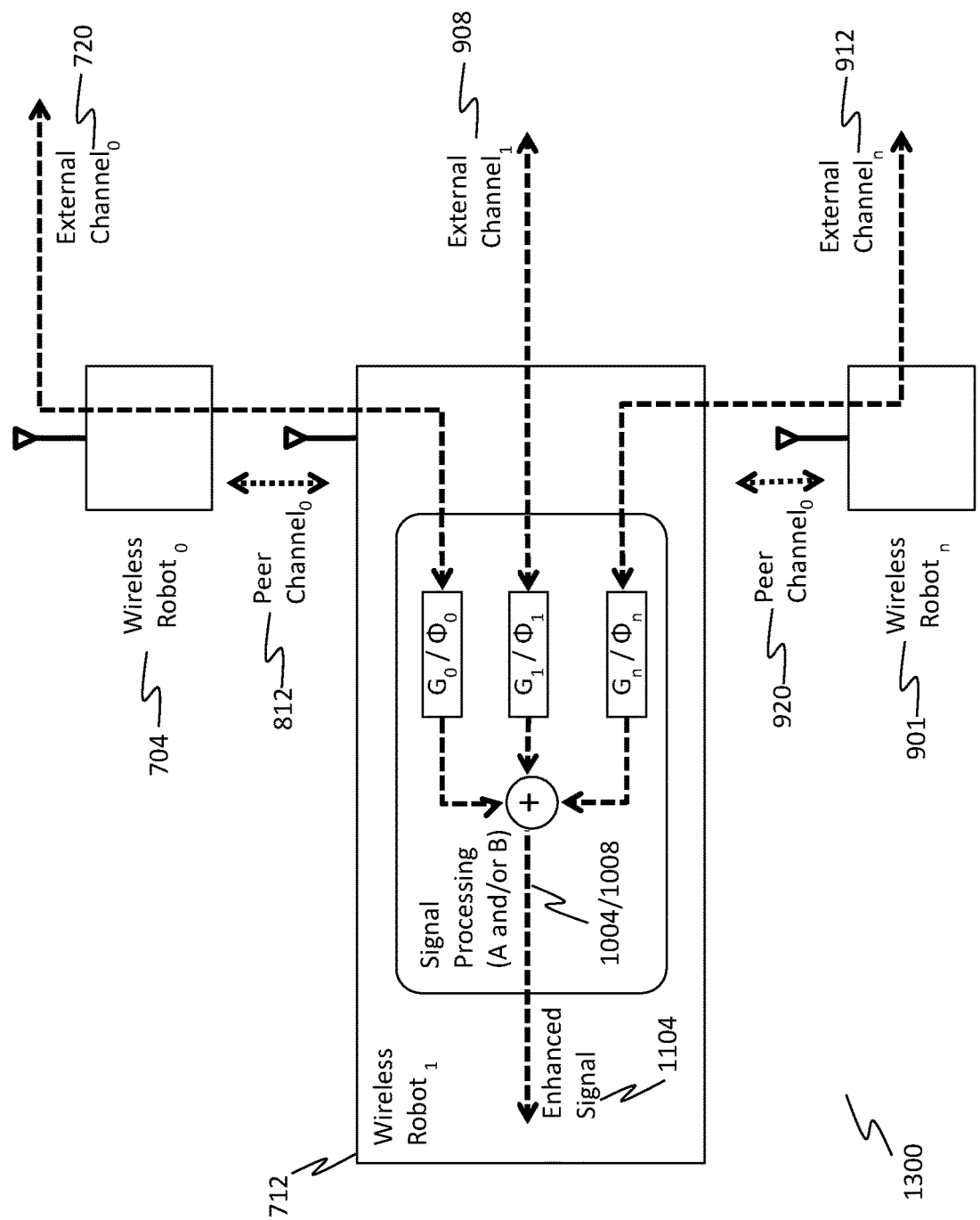
FIG. 13 is an exemplary diagrammatic representation of antenna array processing of "n" external signals in accordance with aspects of the invention.

Referring now to FIG. 13 with reference to methods and systems previously provided in the instant application, antenna array processing of "n" external signals 1300 is provided as another advanced communication technique alone or in combination with methods and systems presented previously for a robotic system 800. Antenna array processing of "n" external signals 1300 includes information that may be carried over external channel 0 720 and may be received by wireless robot 0 704 and forwarded to wireless robot 1 712 utilizing a corresponding peer channel (signal processing A 1004 if received by an external channel or by signal processing B 1008 if received by a peer channel). Information carried over external channel 1 908, may be received directly by wireless robot 1's communications subsystem, and forwarded to corresponding signal processing (signal processing A 1004 if received by an external channel or by signal processing B 1008 if received by a peer channel). Information carried over external channel n 912 may be received by wireless robot n 901 and utilizing a corresponding peer channel communicated to wireless robot 1 712. Information received from the "n" external channels and peer channels, which may now be in signal processing A 1004 and/or signal processing B 1008 of wireless robot 1 712, are processed in accordance with antenna array processing techniques and an enhanced signal 1100 may be transmitted from signal processing A 1004 or signal processing B 1008 or both. It can be readily appreciated that enhanced signal 1104, being available within wireless robot 1 712, can readily be distributed among any or all of the plurality of "m" wireless robots in embodiments of robotic system 800, utilizing methods and systems previously described for operation of peer channels. Additionally, or alternatively, reverse link information (wireless robot to central point) may be processed conversely.

Antenna array processing of "n" external signals 1300 in a robotic system 800 may utilize advantageous spatial separation of the "n" wireless robots communicating over "n" external channels, as shown in FIG. 13. It is noted that with such spatial separation, a wireless interfacing means embodied as part of communications subsystem 524, can operate as one of "n" elements in a wireless interface array. For example, in RF wireless technology these would operate as antenna array elements. It is further noted that antenna array processing of "n" external signals 1300 in a robotic system 800 may perform wireless beam-forming. As shown in FIG. 13, gain and phase adjustments may be applied independently to information carried on each "n" external channel. In an embodiment, by performing gain and phase adjustments independently, based on the relative spatial position of the "n" wireless robots, constructive and destructive interference of the electromagnetic waves stimulated by "n" external channels may result in the formation of beams. In some embodiments, the gain and phase adjustment techniques are applied to enable antenna array processing or a formation of beams, or both. In some embodiments, the formation of beams are static beams or steerable beams.

In another exemplary embodiment, in a case where a relative spatial position of "n" wireless robots may be fixed, as well as a gain and phase adjustment applied to information carried over each of "n" external channels, formed beams may be static in nature. Continuing the same example, and by varying either a relative spatial position of "n" wireless robots, a gain and phase adjustment applied to information carried over each "n" external channels, or both, such formed beams may be time-varying in nature, and can be advantageously steered.

Using antenna array processing of "n" external signals 1300 in a robotic system 800 may enable improved wireless link budget, which may, for example, further increase transition distance, increase information rates, and/or improve information transport quality, as well as other advantages. In addition, the directionality of beams can be advantageously used for interference reduction, directional selectivity, and directional sensing in an embodiment.

Additional methods for configuration of the plurality of "m" wireless robots and management of "n" external channels: given a plurality "m" of wireless robots, and "n" wireless robots communicating with the central point over external channels, where m>n, a redundant system operation could be established whereby should one of the plurality of "n" wireless robots communicating with the central point experience a failure, one of the "m" wireless robots exclusive to the subset of "n" wireless robots could be reassigned to the task of communicating with the central point utilizing the external channel previously utilized by the failed wireless robot. In this way, there is no decrease in the number "n" of wireless robots communicating over external channels, and overall operation of the communication system would not permanently degrade. In some embodiments, the replacement robot comes from the same group.

In the case where the antenna array processing method as described previously is employed, the spatial position of the "n" wireless robots communicating with the central point over external channels could be established so as to allow optimal antenna array gain, and antenna array processing resolution. One such common antenna element spacing is $\lambda/2$, where $\lambda$ is the wavelength of the dominant frequency of the radio frequency carrier for the external channel.

In the case where external channel impairments and/or the amount of information required by the plurality of "m" wireless robots is time-varying, the number of "n" wireless robots assigned to communicate with the central point over external channels could be adjusted dynamically. For example, if the external channel impairments increase, additional wireless robots could be assigned to communicate with the central point, minimizing any impact to system performance. For example, if the information required by the "m" wireless robots increases, additional wireless robots could be assigned to communicate with the central point, providing additional information bandwidth for communication with the central point. In this regard, adjustments may be determined by the at least a portion of the plurality of wireless robots, or by the central point station, or by one or more pre-configured rules, or by any combination thereof.

Consider the plurality of "m" wireless robots operating cooperatively, and possibly autonomously, such as in a swarm. Should the said swarm be required to reconfigure itself in order to execute a maneuver, the subset of "n" wireless robots could be reconfigured within the swarm to maintain any important spatial relationships required to maintain performance over the "n" external channels within the subset of "n" wireless robots, assignment of wireless robots to external channels in the reverse link (robot to central point) and to external channels in the forward link (central point to robot) could be different. This would result in an asymmetric structure of the external channels, which will be easily recognizable to those skilled in the art as advantageous in numerous communications scenarios.

Further, different information types could be assigned to individual wireless robots in the subset of "n" wireless robots communicating with the central point utilizing external channels. In this manner, the transmission characteristics for each information type including, but not limited to information bandwidth and latency, could be individually configured. This too, will be easily recognizable to those skilled in the art as advantageous in numerous communications scenarios.

The configuration and link assignment methods outlined herein could be established at the central point, and communicated to the team of "m" wireless robots over external channels. Alternatively, the team of "m" wireless robots could establish these assignments autonomously, or according to plurality of pre-configured rules (for example, rules previously stored in database 340).

Additional Methods for processing and distribution of signals and information within the plurality of "m" wireless robots:

In FIGS. 7 through 9, the processing of signals and information is shown to be performed by a single wireless robot within the subset of "n" wireless robots communicating with the central point over external channels. Alternatively, this processing could be distributed among the plurality of "m" wireless robots by means previously described. Essentially, information from the "n" external channels would be routed optimally to the "m" wireless robots over peer channels for distributed processing.

Considering the method described above where it is advantageous to distribute the processing of signals and information among the plurality of "m" wireless robots, a further advantageous method would be to distribute a limited subset of signals and information to any of the "m" wireless robots. The limited subset could, for example, only include signals and information that is pertinent only to the distributed processing required to be performed by the given wireless robot. One skilled in the art could easily understand how this would provide an optimization of the bandwidth utilization over the peer channels.

In the methods described previously in this disclosure, processing of the signals and information are shown to be performed by the processing block in the communication subsystem of a given wireless robot. One skilled in the art could also understand that this processing could, if advantageous, be performed within the control subsystem of a given wireless robot.

In the methods described previously in this disclosure, utilization of external channels and peer channels have been described separately. Those skilled in the art could understand the types of wireless communications and channel structure which would enable the same physical channels to be utilized to support both external channels and peer channels simultaneously, obviating the need for two physical instantiations.

Figure 14:
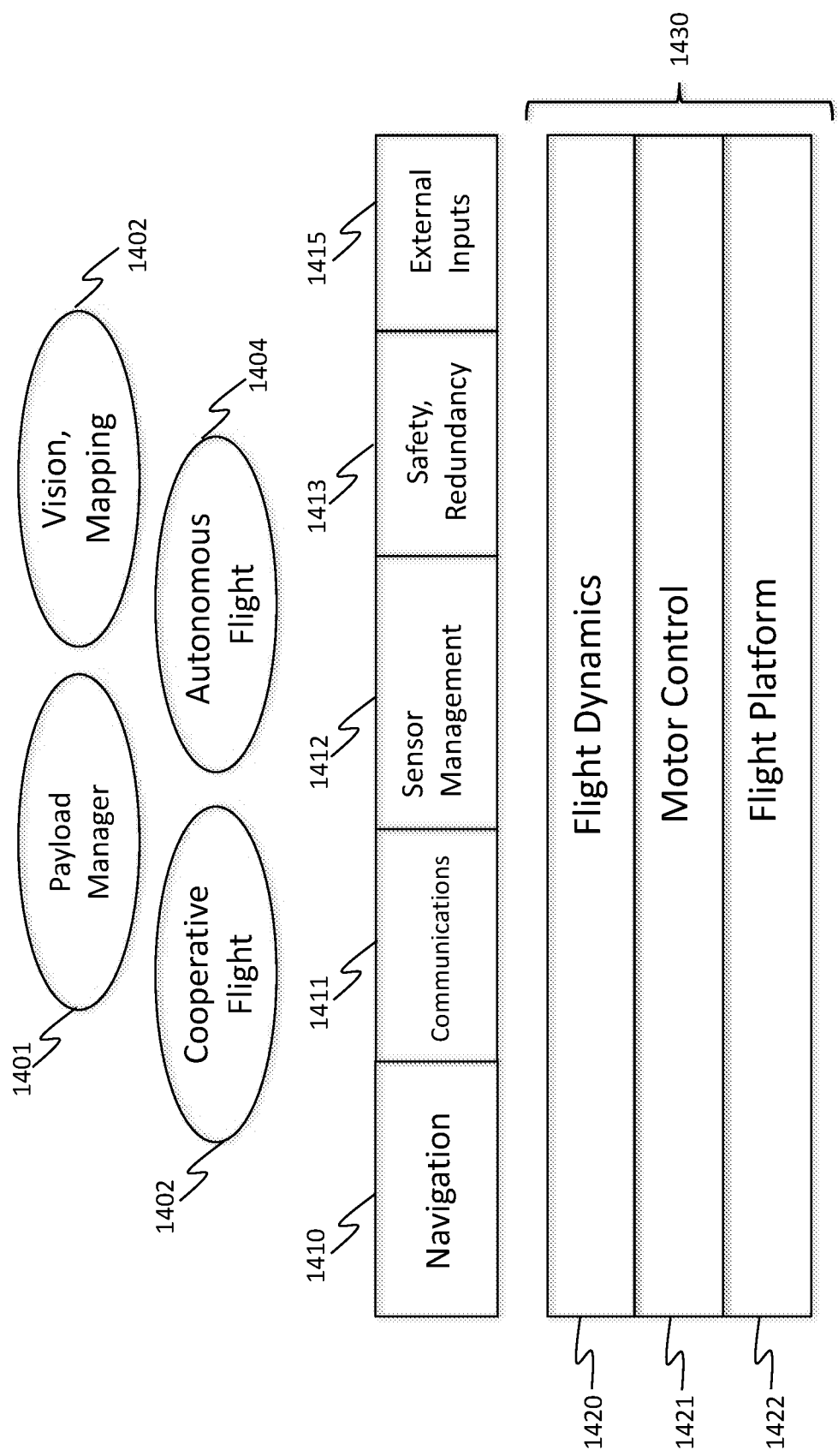
FIG. 14 is a schematic of a layered architecture for aerial robot platforming in accordance with aspects of the invention.

FIG. 14 is a schematic of a layered architecture for aerial robot platforming in accordance with aspects of the invention. According to the embodiment, a layered architecture 1400 for aerial robot platforming comprises an aerial robot services layer that comprises a network-connected robotic device control system computer comprising a processor, a database, a memory, and program code, wherein the program code, stored in the memory, operating on the processor and adapted when executed by the processor, causes the processor to provide functionality required for most aerial robotics applications that may be implemented and reused across many variants of flight platforms comprising, a payload manager 1401 to manage payload 516 (as described in FIG. 5). Payload manager 1401 may control elements of payload 516 such as movements of a robotic arm, or identify payload 516 weight based on sensor readings from sensors 512. In some embodiments, payload manager 1401 may modify or request changes in other components (for example, more power from propulsion 508) based on the nature or task of payload 516.

The robotic device control system computer may further comprise vision and mapping 1402 providing programming instructions to be able to construct (or use) a map or floor plan and for the robot to localize itself in it. In some embodiments, the robot may use idiothetic information sources whereby the robot stores self-motion cues in database 340 to construct a map or understand location (for example, for a land-based robot, tracking the number of revolutions of its wheels). In other embodiments, the robot may use allothetic information sources (for example, from one or more sensors 512 of the robot, such as a camera, a microphone, laser, LIDAR, and/or SONAR), or external cues such as landmarks, to determine position and movement. In other embodiments vision and mapping 1402 may comprise a GPS receiver, WiFi positioning, cell tower ID, triangulation, inertial navigation systems, and the like, or any combination thereof for positioning. In some embodiments, vision and mapping 1402 may dynamically establish geofences and communicate the geofence to other robots for alerts, triggers, or faster location identification. In some embodiments, vision and mapping 1402 may use computer vision for finding and identifying objects in an image or video sequence (for example, by employing techniques such as edge matching, divide and conquer search, greyscale matching, gradient matching, modelbase searches, etc.)

The robotic device control system computer may further comprise cooperative flight controller 1402 to provide communication between a plurality of robots that interact with each other and their environment. In some embodiments, the cooperative controller 1403 provide a cooperative assembly system for terrestrial, water, or subterranean robots (or any combination thereof) to provide communication between a plurality of robots that interact with each other and their environment.

The robotic device control system computer may further comprise autonomous flight controller 1404 which may provide intelligence to performing tasks without explicit human control for unmanned aerial vehicles (UAVs), unmanned ground vehicles (UGVs), autonomous underwater vehicles (AUVs), and autonomous surface vehicles (ASVs). UAVs, UGVs, AUVs, and ASVs are referred to hereinafter as UVs (unmanned vehicles). It should be appreciated that UVs have many applications in emergency situations whereby humans often cannot come close to a dangerous natural disaster such as an earthquake, a flood, an active volcano, a nuclear disaster, a hostile military environment, and the like.

The robotic device control system computer may further comprise navigation controller 1410 which may specify the pose of objects in 3D space and to perform calculations between them (for example, compute the relative motion), employ principles of Bayesian state estimation, implement and apply an extended Kalman filter (EKF) and select appropriate parameters, implement and apply a proportional-integral-derivative (PID) controller for state control, and to fine tune associated parameters, and the like. In some embodiments navigation controller 1410 integrates with vision and mapping 1412 to provide visual motion estimation and 3D mapping.

The robotic device control system computer may further comprise communications controller 1411 which may manage communications between a plurality of robots, one or more central controllers, and other components of system 800. Communication controller 1411 may facilitate user tracking of all communication activities and save all interactions to database 340.

The robotic device control system computer may further comprise sensor manager 1412 which may manage, control, and access information, from one or more sensors and actuators 512.

The robotic device control system computer may further comprise safety and redundancy manager 1413 which may provide duplication of critical components, data, positioning, functions, a backup (or fail-safe) of the system and the plurality of robots to increasing reliability of the system, improve actual system performance, and provide for a safer environment.

The robotic device control system computer may further comprise external inputs interface 1415 may provide an interface to receive information from special components, or functions (or both) to further customize the function of one or more robots.

The robotic device control system may provide for a platform interface layer 1430 that supports multiple flight platforms such as quad vs. hex rotor; "small" vs. "large" machines; various energy sources; progressive generations of flight platforms; etc. and may comprise:

Flight dynamics manager 1420 which may provide a platform for stability and motion control to achieve maneuverability and agility for desired performance metrics and requirements based on the type of robot (for example, in some embodiments, for low speed flight). Flight dynamics manager 1420 may further examine system metrics from flight data, feedback control and linearization from sensors 512 for validation and verification of modeled dynamics, and derive new flight dynamic models based on analysis results.

Motor control manager 1421 may provide energy management and platform health for energy source 528.

Flight platform manager 1422 may provide mechanical, rotors, energy, etc., for propulsion 508 and power distribution for energy source 528.

Exemplary Embodiments

Figure 15:
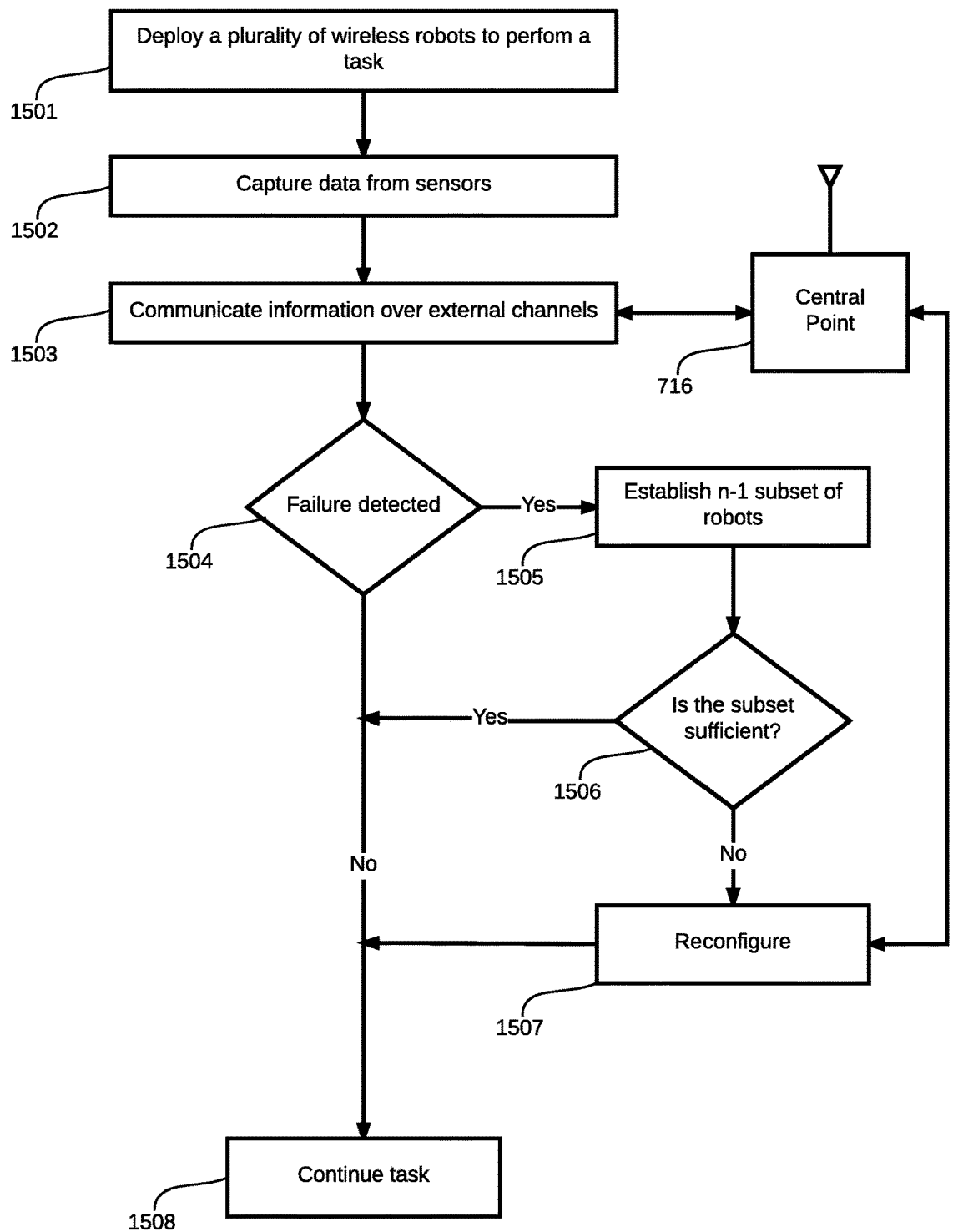
FIG. 15 is an exemplary flow diagram of an aerial mapping application illustrating a robust and diverse robotic system, according to an embodiment of the invention.

FIG. 15 is an exemplary embodiment of an aerial mapping application illustrating a robust and diverse robotic system, according to an embodiment of the invention. According to the embodiment, a plurality of wireless robots deployed in step 1501 to perform an aerial mapping application whereby video recording is performed, in step 1502, by wireless robots of the robotic system for the purpose of surveying a subject area. In this regard, the wireless robots might be collecting video information, with a subset of wireless robots communicating this information, in step 1503, over external channels to central point 716. In a next step 1504, a failure of one of subset of wireless robots may be detected (for example, run short on supply power), and may need to retire from its tasks (that is, it can no longer work as part of robotic system). In this regard, in step 1505, there are still "n−1" comprising the subset, where "n" is the number of wireless robots in a subset of wireless robots, wireless robots communicating video information to central point. "n" will be used throughout this disclosure to represent the number of the subset of robots. Due to redundancy of the "n−1" wireless robots that may be included in robotic system 800, communication of video information may still take place provided that the "n−1" subset is determined to be sufficient, in step 1506, to continue to perform the task in a next step 1508. It is noted that although only video information is used as an example here it will be readily appreciated by a person of skill in the art after reading this disclosure in its entity, the scope of the many forms of information that may be communicated by robotic system 800 using advanced communication techniques.

Continuing the example of the previous paragraph and with reference to FIGS. 8-9, if utilizing "n−1" wireless robots is determined in step not sufficient to support the needs of communicating video information in step 1506, one of the remaining "m−1" wireless robots (where m is the number of wireless robots in robotic system 800) outside of the subset of "n−1" remaining wireless robots may be reconfigured, in step 1507, to communicate over external channels to central point 716, restoring the robotic system to normal operation to continue the task in step 1508. Alternatively, and for example, a subset of "n" wireless robots originally assigned to communicate with central point 716 via external channels, may be pre-configured having one or more wireless robots greater than required to communicate with the central point, such that, if one of the "n" wireless robots fail, robotic system 800 may be dimensioned, in step 1507, to operate without impairments utilizing "n−1" wireless robots.

Figure 16:
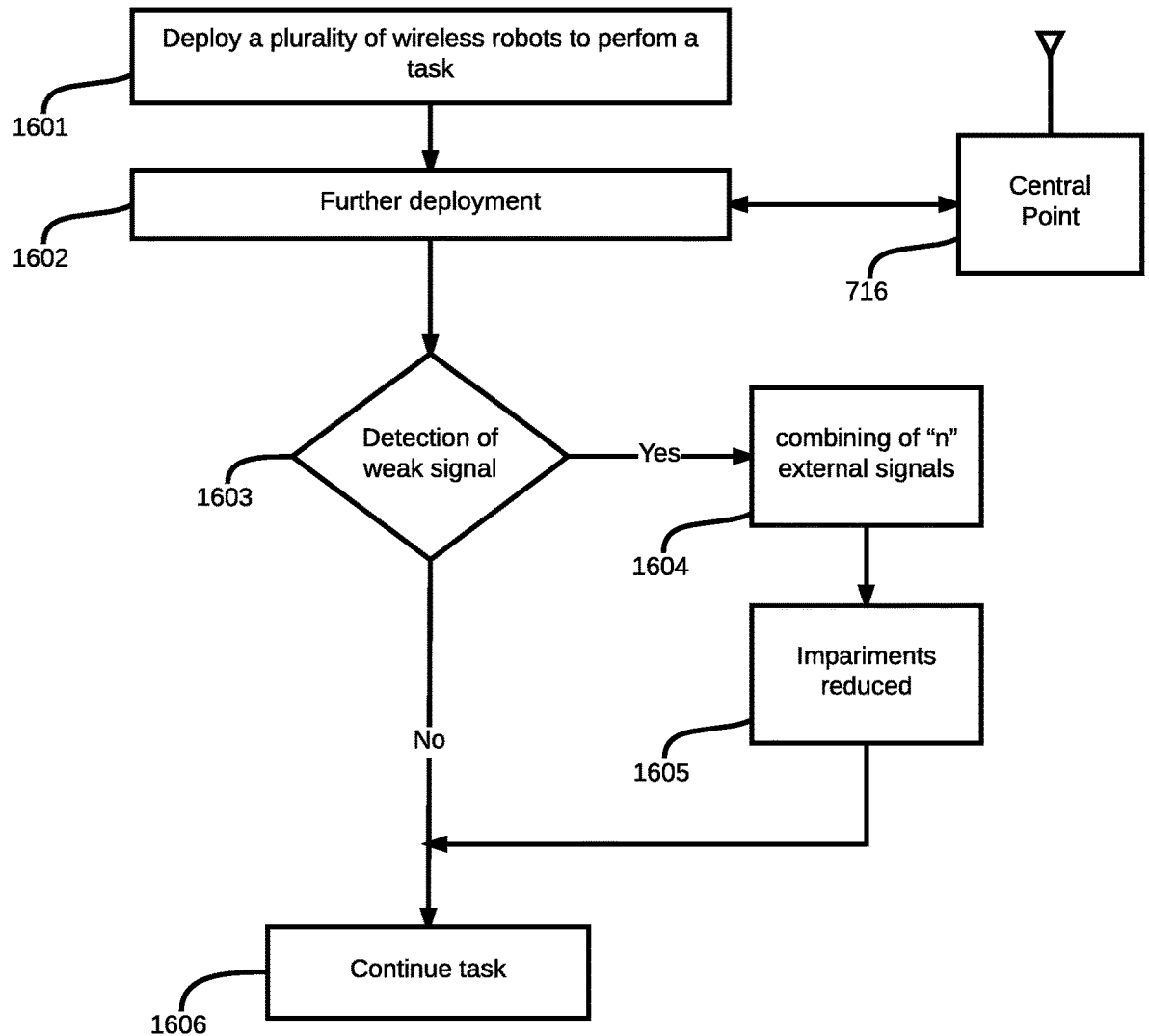
FIG. 16 is an exemplary flow diagram of an aerial mapping application illustrating a power combining of "n" external signals to achieve an extended communication range, according to an embodiment of the invention.

FIG. 16 is an exemplary embodiment of an aerial mapping application illustrating a power combining of "n" external signals to achieve an extended communication range, according to an embodiment of the invention. According to the embodiment, power combining of "n" external signals 1100, robotic system 800 may achieve an extended communication range in an extended communication range for improved performance.

In a first step 1601, consider an aerial mapping application, similar to FIG. 15, whereby a plurality of robots are deployed for video recording to be performed for the purpose of surveying a subject area. In a next step 1602 "m" wireless robots deploy farther and farther away from central point 716 with which the subset of "n" wireless robots may be communicating utilizing external channels. In a next step 1603, a signal received over external channels may become weaker and the information transported over the external channels can degrade and errors may result due to a lower signal to noise ratio (SNR). One skilled in the art will readily appreciate the other digital types of signal power degradation which would occur in such a case. In addition, in some environments the signal received over the external channels may be subject to a higher degree of multi-path fading effects, further degrading the information transported.

By using a robotic system with power combining of "n" external signals 1100 described above in step 1604, the SNR can be increased, thereby reducing said impairments at increased distances from central point in step 1605 and the task of the plurality of wireless robots continues in step 1606. Likewise, such a robotic system 800 with power combining of "n" external signals 1100 may, by virtue of the spatial diversity of the "n" wireless robots communicating with central point 716, substantially reduce the multipath fading effects. These advanced communication techniques may effectively extend the range at which the team of "m" Robots can operate away from central point 716.

Figure 17:
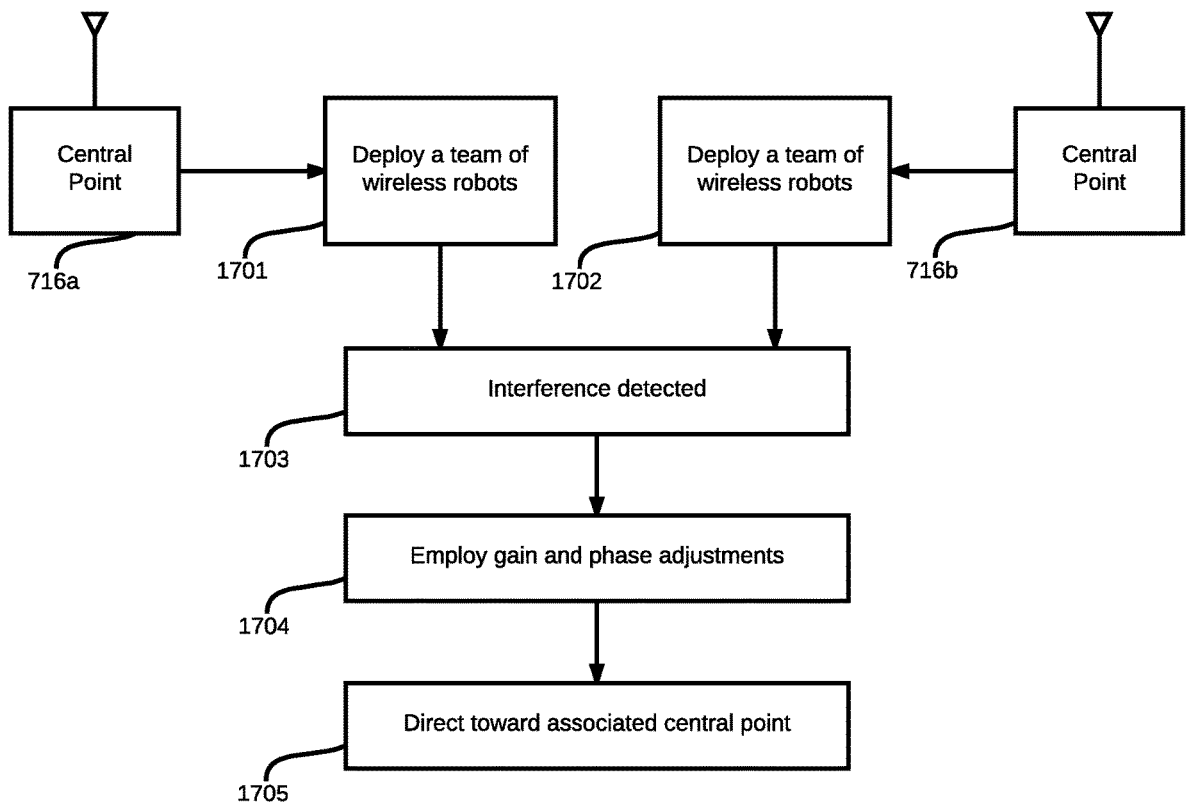
FIG. 17 is an exemplary flow diagram illustrating an antenna array processing of "n" external signals in a robotic system, according to an embodiment of the invention.

In some embodiments, given that "n" wireless robots may be spatially separated, one can understand that there may be temporal diversity in signals communicated over external channels, as well as spatial diversity in the signals. Accordingly, method 1600 may account for temporal (and spatial diversity) by applying an appropriate pre-coding (pre-processing) and combining associated with MIMO techniques described previously. FIG. 17 is an exemplary embodiment illustrating an antenna array processing of "n" external signals in a robotic system, according to an embodiment of the invention. According to the embodiment, an antenna array processing of "n" external signals 1300 in a robotic system 800 and an associated utility of steered beams is depicted.

In steps 1701 and 1702, consider two independent teams of wireless robots, each team being deployed to perform a task (for example, an aerial mapping application, an undersea monitoring application, etc.). Two independent teams each comprised of "n" wireless robots that may need to communicate with a different central point 716a and 716b via external channels. In this example embodiment of an antenna array processing of "n" external signals 1300 in a robotic system 800 it will be appreciated that in certain circumstances there could be signal interface between two independent teams of wireless robots detected, in step 1703, and this interference may be catastrophic to a mission in either application. Continuing with this example and with continued reference to methods and systems presented in the instant application, in a next step 1704, each independent team of "n" wireless robots may employ gain and phase adjustments to the signals communicated over the external channels to form narrow and focused beams. Gain and phase adjustments would be set such that the beam of one independent team of "n" wireless robots would be directed toward the central point associated with that team, in step 1705. In a likewise manner, the beam of the other independent team of robots would be directed toward the central point associated with that other team. In this manner, such undesirable interference would be reduced or eliminated.

Additional Apparatus for Any of the "m" Wireless Robots

The wireless interface means described previously as part of the communications subsystem (an antenna in the case of RF wireless communications) could advantageously be implemented with omnidirectional properties, or with directional properties. One skilled in the art could understand how this would be done, and in what situations it would be advantageous.

Further, the positioning and orientation of the team of wireless robots, each providing an external channel, could be configured such that the aggregate signal produced by the team of wireless robots has omnidirectional or directional properties, as appropriate for the application.

The orientation of the wireless interface means relative to the wireless robot could advantageously be time varying, or steerable. The control subsystem would perform the setting and adjustment of said time-varying orientation, with possible input from the communications subsystem.

A computer system, as described in FIGS. 1-4, may comprise a set of programming instructions for causing a processor of a control system, such as the robotic system of FIGS. 9-13 and wireless robot system of FIG. 5, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The skilled person will be aware of a range of possible modifications of the various embodiments described above. Accordingly, the present invention is defined by the claims and their equivalents.

What is claimed is:

1. A system for communication between a plurality of wireless robots comprising:
   a plurality of wireless robots, each comprising, at least:
      a mechanical framework;
      a communication module; and,
      an energy source;
   wherein each robot of the plurality of wireless robots is operable for movement via an associated propulsion unit;
   wherein the communication module comprises a plurality of peer channels and a plurality of external channels;
   wherein at least a portion of the plurality of wireless robots are in communication with at least one central point station, utilizing at least one external channel of the plurality of external channels;
   wherein the plurality of wireless robots are operable to communicate with one another using the plurality of peer channels;
   wherein at least one of the at least a portion of the plurality wireless robots form a communication arrangement, the communications arrangement operable to process information via the plurality of external channels, the plurality of peer channels, or both;
   wherein information exchanged with the at least one central point utilizing the at least one external channel is communicated to the plurality of wireless robots utilizing at least a portion of the plurality of peer channels;
   wherein the at least portion of the plurality of wireless robots to process external channels in a reverse link is different than or asymmetric to another at least plurality of wireless robots to process external channels in a forward link.

2. The system of claim 1, wherein the plurality of peer channels and the plurality of external channels are the same channels.

3. The system of claim 1, wherein the at least one central point is a station selected from the group consisting of a base location, another plurality of wireless robots, and mobile wireless communication point.

4. The system of claim 1, further comprising:
a control subsystem;
wherein processing information from external channels, peer channels, or both, is performed by the control subsystem.

5. The system of claim 1, wherein the communication arrangement pre-processes exchanged information prior to communication among the plurality of wireless robots utilizing peer channels.

6. The system of claim 1, wherein the communication arrangement processes the information exchanged in accordance with power combining techniques.

7. The system of claim 1, wherein the communication arrangement processes the information exchanged in accordance with MIMO processing techniques.

8. The system of claim 1, wherein the communication arrangement processes the information exchanged in accordance with gain and phase adjustment techniques.

9. The system of claim 8, wherein the gain and phase adjustment techniques are applied to enable antenna array processing or a formation of beams, or both.

10. The system of claim 9, wherein the formation of beams are static beams or steerable beams.

11. The system of claim 8, wherein if a first of the at least portion of the plurality of wireless robots communicating with the central point fails, a second wireless robot of the plurality of wireless robots is redundantly assigned to perform functions of the first wireless robot.

12. The system of claim 11, wherein the second wireless robot is exclusive to the at least portion of the plurality of wireless robots.

13. The system of claim 8, wherein spatial relationships of the at least portion of the plurality of wireless robots to enable antenna array processing, are determined by the at least a portion of the plurality of wireless robots, or by the central point station, or by one or more pre-configured rules, or by any combination thereof.

14. The system of claim 1, wherein the number of the at least portion of the plurality of wireless robots communicating with the central point utilizing external channels is dynamically allocated according to a level of impairments on the external channels, or the amount of information required by the plurality of wireless robots, or both.

15. A method for communication between a plurality of wireless robots comprising the steps of:
wirelessly communicating, between a central point station and at least a portion of a plurality of wireless robots, information via a plurality of external channels;
determining an appropriate communication arrangement; and,
executing, by the plurality of wireless robots, the communications arrangement;
wherein the plurality of wireless robots is operable to communicate with one another using a plurality of peer channels; and,
wherein the determination of the appropriate communication arrangement is based on the communication type and decided by the at least a portion of the plurality of wireless robots, or by the central point station, or by one or more pre-configured rules, or by any combination thereof
wherein the at least portion of the plurality of wireless robots to process external channels in a reverse link is different than or asymmetric to another at least plurality of wireless robots to process external channels in a forward link.

16. The method of claim 15, wherein the plurality of peer channels and the plurality of external channels are the same channels.

17. The method of claim 15, wherein the advanced communication arrangement pre-processes information communicated via external channels prior to communication among the plurality of wireless robots via the plurality of peer channels.

18. The method of claim 15, wherein the advanced communication arrangement processes the information communicated via external channels in accordance with power combining techniques prior to communication among the plurality of wireless robots.

19. The method of claim 15, wherein the advanced communication arrangement processes the information communicated via external channels in accordance with MIMO processing techniques prior to communication among the plurality of wireless robots.

20. The method of claim 15, wherein the advanced communication arrangement processes the information communicated via external channels in accordance with gain and phase adjustment techniques prior to communication among the plurality of wireless robots.

* * * * *